(12) United States Patent
Hasegawa et al.

(10) Patent No.: US 8,018,132 B2
(45) Date of Patent: *Sep. 13, 2011

(54) MANUFACTURING METHOD OF AIRTIGHT CONTAINER, MANUFACTURING METHOD OF IMAGE DISPLAY DEVICE, AND BONDING METHOD

(75) Inventors: Mitsutoshi Hasegawa, Kanagawa (JP); Masaki Tokioka, Kanagawa (JP); Tokutaka Miura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/943,052

(22) Filed: Nov. 10, 2010

(65) Prior Publication Data

US 2011/0050087 A1 Mar. 3, 2011

Related U.S. Application Data

(60) Continuation of application No. 11/552,377, filed on Oct. 24, 2006, now Pat. No. 7,888,854, which is a division of application No. 10/684,470, filed on Oct. 15, 2003, now Pat. No. 7,143,927.

(30) Foreign Application Priority Data

Oct. 21, 2002 (JP) .................................. 2002-305320
Sep. 30, 2003 (JP) .................................. 2003-338984

(51) Int. Cl.
*H01J 1/62* (2006.01)
*H01L 27/15* (2006.01)
(52) U.S. Cl. ............................ 313/493; 257/79; 313/634
(58) Field of Classification Search .................. 313/493, 313/634; 257/79; 445/23, 45
See application file for complete search history.

(56) References Cited

U.S. PATENT DOCUMENTS

| | | |
|---|---|---|
| 6,489,720 B1 | 12/2002 | Gofuku et al. |
| 6,528,939 B1 | 3/2003 | Kawase |
| 6,559,596 B1 | 5/2003 | Arai et al. |
| 6,600,263 B1 | 7/2003 | Ito |
| 6,762,542 B2 | 7/2004 | Nukanobu et al. |
| 6,780,074 B2 | 8/2004 | Ouchi |
| 6,847,161 B2 | 1/2005 | Ito |
| 7,008,285 B2 | 3/2006 | Nakata et al. |
| 7,067,171 B1 | 6/2006 | Ito |
| 7,143,927 B2 | 12/2006 | Hasegawa et al. |
| 7,195,533 B2 | 3/2007 | Hasegawa |
| 7,218,045 B2 | 5/2007 | Jang et al. |
| 7,218,058 B2 | 5/2007 | Sagawa et al. |

(Continued)

FOREIGN PATENT DOCUMENTS

EP 1 258 906 A1 11/2002

(Continued)

*Primary Examiner* — Mary Wilczewski
(74) *Attorney, Agent, or Firm* — Fitzpatrick, Cella, Harper & Scinto

(57) ABSTRACT

A bonding method using a bonding agent is provided, which has the steps of forming an underlayer on a first member, providing a bonding agent on the underlayer, forming a contact member, different from the bonding agent, on a second member, bringing the bonding agent into contact with the contact member so that the first member and the second member are bonded to each other. In the method described above, the wettability of the bonding agent to the underlayer is superior to that of the bonding agent to a surface of the first member before the underlayer is formed thereon, and the bondability of the bonding agent to the contact member is superior to that of the bonding agent to a surface of the second member before the contact member is formed thereon.

12 Claims, 18 Drawing Sheets

U.S. PATENT DOCUMENTS

| | | |
|---|---|---|
| 7,308,819 B2 | 12/2007 | Kamio et al. |
| 7,368,866 B2 | 5/2008 | Hasegawa et al. |
| 7,513,814 B2 | 4/2009 | Kobayashi et al. |
| 7,572,164 B2 | 8/2009 | Takeda et al. |
| 2002/0180342 A1 | 12/2002 | Yamada et al. |
| 2006/0250565 A1 | 11/2006 | Enomoto et al. |
| 2007/0045386 A1 | 3/2007 | Hasegawa et al. |
| 2007/0182304 A1 | 8/2007 | Jang et al. |

FOREIGN PATENT DOCUMENTS

| | | |
|---|---|---|
| JP | 7-140903 A | 6/1995 |
| JP | 9-092184 A | 4/1997 |
| JP | 09-092184 A | 4/1997 |
| JP | 2000-200543 A | 7/2000 |
| JP | 2000-215791 A | 8/2000 |
| JP | 2000-251654 A | 9/2000 |
| JP | 2000-251713 A | 9/2000 |
| JP | 2000-251786 A | 9/2000 |
| JP | 2001-210258 A | 8/2001 |
| JP | 2001-319561 A | 11/2001 |
| JP | 2002-182585 A | 6/2002 |
| JP | 2002-184313 A | 6/2002 |
| JP | 2002-184328 A | 6/2002 |
| JP | 2002-184329 A | 6/2002 |
| JP | 2002-184330 A | 6/2002 |
| JP | 2002-184331 A | 6/2002 |
| JP | 2003-077396 A | 3/2003 |
| KR | 2002-0065934 A | 8/2002 |
| WO | 00/63130 A1 | 10/2000 |
| WO | 01/05416 A1 | 7/2001 |

22,23    24

22,23 24 25

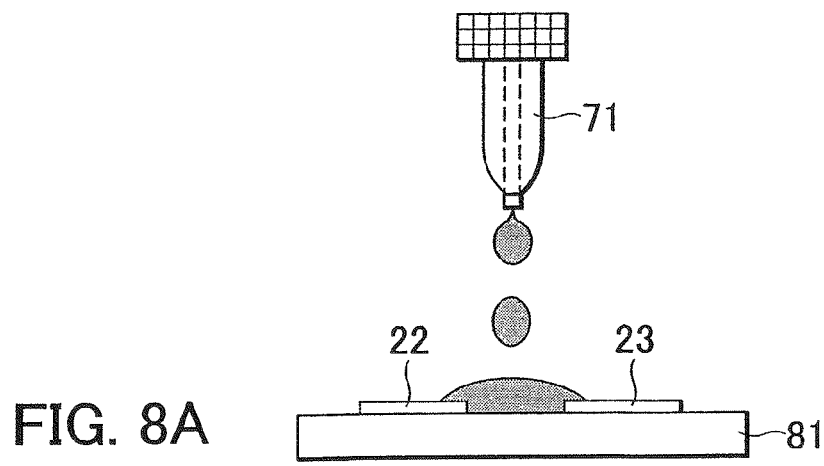
FIG. 8A
FIG. 8B
FIG. 8C
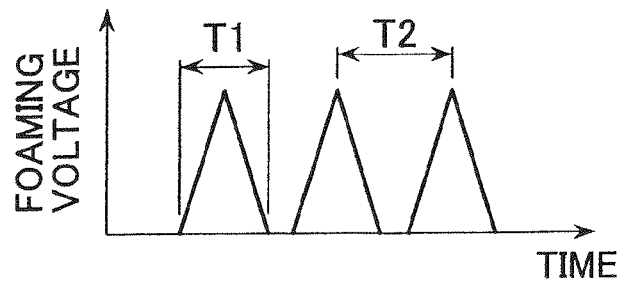
FIG. 9A
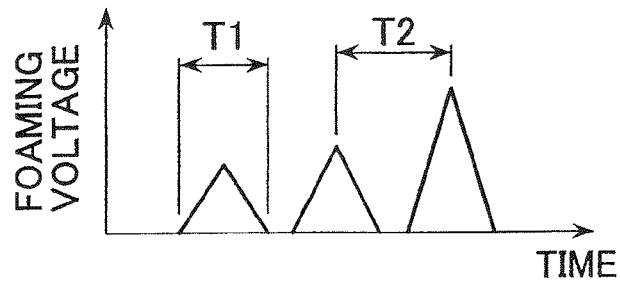
FIG. 9B

92 FLUORESCENT UNIT

91 BLACK CONDUCTOR

92 FLUORESCENT UNIT

91 BLACK CONDUCTOR

US 8,018,132 B2

MANUFACTURING METHOD OF AIRTIGHT CONTAINER, MANUFACTURING METHOD OF IMAGE DISPLAY DEVICE, AND BONDING METHOD

This is a continuation of application Ser. No. 11/552,377, filed Oct. 24, 2006, which is a divisional of application Ser. No. 10/684,470, filed on Oct. 15, 2003, now U.S. Pat. No. 7,143,927, issued Dec. 5, 2006.

BACKGROUND OF THE INVENTION

1. Field of the Invention

The present invention relates to methods for bonding members to each other. In addition, the present invention relates to methods for manufacturing airtight containers and image display devices.

2. Description of the Related Art

Airtight containers have been widely used. In particular, in the field of image display devices, manufacturing of airtight containers has been a very important technique.

At present, for image display devices, a cathode ray tube (CRT) has been widely used. In recent years, a CRT tube having a display screen size of more than 30 inches has been introduced on the market.

In addition, as a flat type image display device, for example, there may be mentioned a plasma display device (PDP) in which a fluorescent film is excited to emit light when irradiated with ultraviolet rays, and a flat type image display device in which a fluorescent film is excited to emit light when irradiated with electrons emitted from an electron emission element such as a field emission type (FE) electron emission element or a surface conduction electron emission element used as an electron source. Recently, a PDP having a large screen size, such as approximately 40 inches, has been available on the market.

Since the image display devices as described above each have an airtight container, the manufacturing method thereof comprises a step of forming an airtight container. For example, a manufacturing method of an image display device has been known in which a substrate for an electron source and a substrate provided with a fluorescent film are bonded to each other to form an airtight container.

A method for bonding two members to each other, a method for manufacturing a vacuum envelope using the bonded two members, and a method for manufacturing an image display device using the above envelope are disclosed, for example, in Japanese Unexamined Patent Application Publication No. 2002-184313. In this patent document, the structure is disclosed in which a metal sealing material is supplied on an underlayer, and sealing is then performed.

In addition, in Japanese Patent Laid-Open No. 2002-182585, the structure is disclosed in which indium and a silicone adhesive are disposed side by side on a frame, and sealing is then performed.

FIG. 13 is a schematic view of a general structure of a display panel formed of an electron source substrate and a large number of electron emission elements disposed thereon. In addition, FIG. 21 shows a schematic cross-sectional structure of a peripheral portion of a display panel (envelope 90).

In FIGS. 13 and 21, reference numeral 81 indicates an electron source substrate on which a large number of electron emission elements (not shown) are disposed, and this electron source substrate 81 may be called a rear plate in some cases. Reference numeral 82 indicates a face plate in which a fluorescent film, a metal back, and the like are formed on a glass substrate. Reference numeral 86 indicates a support frame.

The envelope 90 is formed by adhering the rear plate 81, the support frame 86, and the face plate 82 to each other for sealing. Hereinafter, a process of sealing the envelope will be briefly described with reference to FIG. 21.

First, the rear plate 81 and the support frame 86 are bonded to each other beforehand with a frit glass 202.

Next, an indium (In) film 93 used as a panel boding agent is provided for the support frame 86 and the face plate 82 by soldering. In this step, in order to increase the adhesion of the In film 93 to the support frame 86 and the face plate 82, silver paste films 204 are provided as an underlayer as shown in FIG. 21.

Subsequently, in a vacuum chamber, sealing is performed by bonding the support frame 86 to the face plate 82 with the In film 93 provided therebetween at a temperature equal to or more than a melting point of In, thereby forming the envelope 90.

SUMMARY OF THE INVENTION

An object of the present invention is to provide a novel bonding method which can realize highly reliable bonding between members.

In addition, another object of the present invention is to provide a manufacturing method of an airtight container which can maintain an airtight condition with high reliability, and also to prove a manufacturing method of an image display device having superior display performance.

In accordance with a first aspect of the present invention, there is provided a method for manufacturing an airtight container, which comprises: a bonding step of bonding a first member and a second member, in which the bonding step comprises: a first step of forming an underlayer on the first member; a second step of providing a bonding agent on the underlayer; a third step of forming a contact member, which is different from the bonding agent, on the second member; and a fourth step of bringing the bonding agent into contact with the contact member. In the manufacturing method described above, the wettability of the bonding agent to the underlayer is superior to that of the bonding agent to a surface of the first member prior to the first step; the bondability of the bonding agent to the contact member is superior to that of the bonding agent to a surface of the second member prior to the third step, and the third step is performed after a predetermined treatment is performed for the second member. In the manufacturing method according to the first aspect of the present invention, the first, the second, the third, and the fourth steps described above are not necessary to be performed in that order.

As the predetermined treatment, for example, a step of forming a film on the second member or a step of exposing the second member to a predetermined atmosphere may be mentioned. After the predetermined treatment is performed, when a position of the second member on which the bonding agent is provided is not suitable for bonding, by performing the third step of forming the contact member after the predetermined treatment, superior bonding can be realized.

According to a second aspect of the present invention, in the manufacturing method according to the first aspect, the bonding step is a step of forming a closed bond line which defines an airtight space by bonding the first member and the second member; the contact member formed in the third step is placed at least all along a position at which the closed bond line is to be formed so as to be brought into contact with the bonding agent; and the bondability of the bonding agent to the contact member placed all along the position at which the closed bond line is to be formed is superior to that of the bonding agent to a surface of the second member prior to the third step.

In accordance with a third aspect of the present invention, there is provided a method for manufacturing an airtight container, comprising: a bond line forming step of bonding a first member and a second member to form a closed bond line which defines an airtight space, in which the bond line forming step comprises: a first step of forming an underlayer on the first member; a second step of providing a bonding agent on the underlayer; a third step of placing a contact member, which is different from the bonding agent, all along a position of the second member at which the closed bond line is to be formed; and a fourth step of bringing the bonding agent into contact with the contact member. In the manufacturing method described above, the wettability of the bonding agent to the underlayer is superior to that of the bonding agent to a surface of the first member prior to the first step, and the bondability of the bonding agent to the contact member is superior to that of the bonding agent to a surface of the second member prior to the third step.

According to a fourth aspect of the present invention, in the manufacturing method of one of the first to the third aspects, the bonding agent preferably comprises a metal. In this case, it is not always necessary that the entire bonding agent be made of a metal. In addition, as a metal, an alloy may also be used. The bonding agent is preferably has a low melting point. In particular, a bonding agent having a melting point of 200° C. or less is preferably used. It is more preferable that a low melting point metal be used, and in particular, that a low melting point metal having a melting point of 200° C. or less be used.

According to a fifth aspect of the present invention, in the manufacturing method of one of the first to the fourth aspects, the underlayer preferably comprises a metal. In particular, a surface of the underlayer to be brought into contact with the bonding agent preferably comprises a metal.

According to a sixth aspect of the present invention, in the manufacturing method of the fourth aspect, the underlayer is preferably made of a metal which is unlikely to be oxidized as compared to that for the bonding agent.

According to a seventh aspect of the present invention, in the manufacturing method of one of the first to the sixth aspects, the bonding agent preferably comprises an oxide at a position which is to be brought into contact with the contact member.

According to an eighth aspect of the present invention, in the manufacturing method of one of the first to the seventh aspects, the contact member preferably comprises an oxide at a position which is to be brought into contact with the bonding agent.

According to a ninth aspect of the present invention, in the manufacturing method of the eighth aspect, the oxide preferably comprises $SiO_2$ or PbO.

According to a tenth aspect of the present invention, in the manufacturing method of one of the first to the ninth aspects, the second step of providing the bonding agent on the underlayer is preferably performed under the conditions in which at least a surface of the bonding agent is oxidized. For example, as the second step of providing the bonding agent on the underlayer, there may be a step of disposing the bonding agent on the underlayer at a temperature at which at least a part of the bonding agent is melted. In addition or alternatively, a step may be used in which at least a part of the bonding agent is melted at a maximum temperature which is obtained from the end of the second step of providing the bonding agent to the end of the bonding step. In this case, the bonding agent is likely to be oxidized by oxygen present in the atmosphere. Under the conditions described above, in particular, the manufacturing method of the present invention is advantageously performed. In addition, at the maximum temperature mentioned above, it is preferable that the contact member be not melted.

In accordance with an eleventh aspect of the present invention, there is provided a method for manufacturing an image display device having an airtight container and display elements placed therein, which comprises the step of forming the airtight container by one of the manufacturing methods according to the first to the tenth aspects.

According to a twelfth aspect of the present invention, in the manufacturing method of the eleventh aspect, the airtight container preferably comprises a first substrate, a second substrate facing thereto, and a surrounding member surrounding an airtight space formed between the first substrate and the second substrate, and the first member may be the envelope member.

According to a thirteenth aspect of the present invention, in the manufacturing method in accordance with the eleventh aspect, the airtight container preferably comprises a first substrate, a second substrate facing thereto, and a surrounding member surrounding an airtight space formed between the first substrate and the second substrate, and the first member may be the first substrate or the second substrate.

In accordance with a fourteenth aspect of the present invention, there is provided a method for manufacturing an image display device having an airtight container and display elements placed therein, comprising the step of forming the airtight container by the manufacturing method according to the first aspect or the second aspect. In the method for manufacturing an image display device, described above, the predetermined treatment is a step of forming at least a part of the display elements on the second member or a step of forming at least a part of wires, which supply signals to the display elements, on the second member. This manufacturing method in accordance with the fourteenth aspect may also be combined with at least one of the methods in accordance with the fourth to the tenth aspects.

In accordance with a fifteenth aspect of the present invention, there is provided a method for manufacturing an image display device having an airtight container and display elements placed therein, comprising the step of forming the airtight container by the manufacturing method according to the first aspect or the second aspect. In the method for manufacturing an image display device, described above, the predetermined treatment is a step of forming at least a part of wires, which supply signals to the display elements, on the second member, and at least a part of the contact member is formed on said at least a part of wires. This manufacturing method in accordance with the fifteenth aspect may also be combined with at least one of the methods in accordance with the fourth to the tenth aspects.

In accordance with a sixteenth aspect of the present invention, there is provided a method for manufacturing an image display device having an airtight container and display elements placed therein, comprising the step of forming the airtight container by the manufacturing method according to the first aspect or the second aspect of the present invention. In the method for manufacturing an image display device, described above, the predetermined treatment is a step of forming an electrode or a fluorescent film on the second member. This manufacturing method in accordance with the sixteenth aspect may also be combined with at least one of the methods in accordance with the fourth to the tenth aspects. In addition, each of the methods for manufacturing an image display device, described above, may further comprise a step of forming the display elements described above. The step of forming the display elements may be performed before or after the step of forming the airtight container. In addition, when the step of forming the display elements includes a plurality of substeps, some of the substeps may be performed before the step of forming the airtight container and the other substeps may be performed after the step described above.

In accordance with a seventeen aspect of the present invention, there is provided a bonding method using a bonding agent, comprising the steps of: forming an underlayer on a first member; providing the bonding agent on the underlayer; forming a contact member, which is different from the bonding agent, on a second member; and bringing the bonding agent into contact with the contact member so that the first member and the second member are bonded to each other. In the bonding method described above, the wettability of the bonding agent to the underlayer is superior to that of the bonding agent to a surface of the first member before the underlayer is formed thereon, and the bondability of the bonding agent to the contact member is superior to that of the bonding agent to a surface of the second member before the contact member is formed thereon.

According to the aspects of the present invention described above, it is preferable when the bondability of the contact member to the bonding agent is superior to that of the same material as that for the underlayer, which is provided on the second member instead of the contact member, to the bonding agent.

In the manufacturing methods in accordance with the aspects of the present invention, described above, the step of bringing the bonding agent into contact with the contact member is preferably performed in a reduced-pressure atmosphere.

In the manufacturing methods in accordance with the aspects of the present invention, the temperature at which the bonding agent and the contact member are brought into contact with each other is preferably a temperature at which the contact member will not flow. In particular, before the bonding agent and the contact member are brought into contact with each other, and in more particular, after the bonding agent is provided on the underlayer and before the bonding agent and the contact member are brought into contact with each other, the temperature may be increased so that the bonding agent has a high fluidity; however, in the case described above, the bonding agent and the contact member are preferably brought into contact with each other when the fluidity of the bonding agent is suppressed by decreasing the temperature lower than that at which the high fluidity of the bonding agent is obtained. In addition, in the manufacturing methods of the present invention described above, as the underlayer, silver, gold, platinum, or an alloy containing at least one of the metals mentioned above is preferably used.

Further objects, features and advantages of the present invention will become apparent from the following description of the preferred embodiments with reference to the attached drawings.

BRIEF DESCRIPTION OF THE DRAWINGS

FIGS. 8A, 8B, and 8C are explanatory views of a manufacturing step of the electron source shown in FIG. 2.

FIGS. 9A and 9B are graphs of a foaming voltage with time.

DESCRIPTION OF THE PREFERRED EMBODIMENTS

Figure 1:
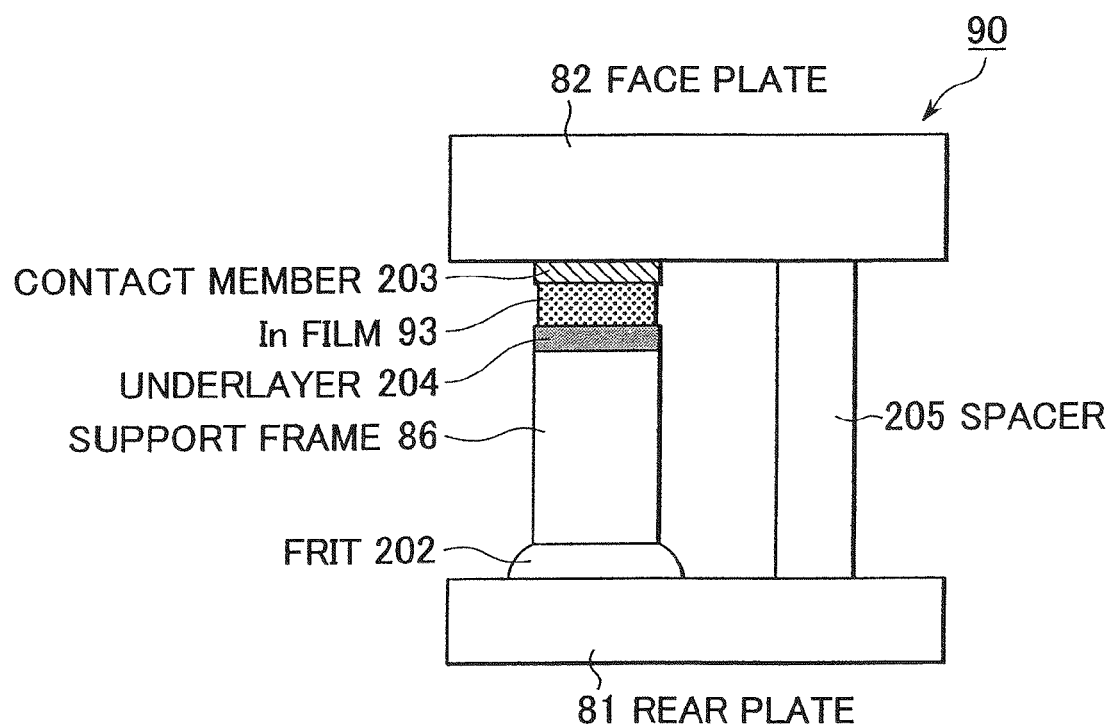
FIG. 1 is a schematic cross-sectional view of a peripheral portion of an envelope of the present invention.

The embodiments according to the above invention will be described. In the embodiments, a bonding method and a manufacturing method of an image display device, which is also a manufacturing method of an airtight container, according to the present invention, will be described with reference to particular examples. In particular, it is intended to realize the embodiment in which a bonding agent is provided so as to exhibit superior and uniform properties. When an underlayer to improve the wettability is formed on one of members, that is, a first member, the uniformity can be improved. As a process in which a bonding agent is provided using the wettability, a process may be preferably used in which at least a part of the bonding agent is melted while being in contact with the underlayer. In more particular, the process described above can be achieved when a bonding agent in a molten state is provided on an underlayer, or when a boding agent is melted after disposed thereon. When a uniform bonding agent is realized using the wettability, it was found that the presence of an oxide formed on the surface of the bonding agent may cause a problem. For example, when a bonding agent is provided on an underlayer while being heated, or when a bonding agent is provided thereon in an oxygen-containing atmosphere, such as in the air, the surface of the bonding agent is liable to be oxidized. Accordingly, a contact member having superior bondability to the other member, that is, a second member to be bonded to the first member mentioned above, is provided on the second member, thereby improving the bondability between the first and the second members.

The difference in wettability in the present invention can be confirmed by the following method. That is, the spread width of the bonding agent applied on the underlayer of the first member is measured. Next, the spread width of the bonding agent applied on the first member, which is not provided with the underlayer (prior to the formation of the underlayer), under the same condition as that in the above measurement is measured. Subsequently, the spread width obtained when the underlayer is provided is divided by that obtained when the underlayer is not provided, and when the value thus obtained is one or more, it is confirmed that the wettability of the bonding agent to the underlayer is superior to that of the bonding agent to a surface of the first member which is not provided with the underlayer.

In addition, the bondability of the bonding agent to the contact member superior to that of the bonding agent to a surface of the second member, which is not provided with the contact member (prior to the formation of the contact member), can be confirmed by the following method. That is, a first airtight container is formed using the bonding method or the manufacturing method of an airtight container, according to the present invention. An air pipe is provided for this airtight container. Ten first airtight containers are formed. Under the same conditions as those for this first airtight container, a second airtight container is formed using the second member which is not provided with the contact member. An air pipe is also provided for the second airtight container. Ten second airtight containers are also formed. To these airtight containers, helium is blown, and using a helium leak detector connected to the air pipe provided for each airtight container, the amount of helium which enters the airtight container is measured. The measurement condition is set such that a helium amount of $1 \times 10^{-12}$ Pa·m$^3$/s or more is detected for at least five out of the 20 airtight containers. In particular, first, the helium amounts of the 20 airtight containers are measured while a force is not applied to the bonded portion in a separating direction. In this step, when a helium amount of $1 \times 10^{-12}$ Pa·m$^3$/s or more is detected for four airtight containers or less out of the 20 airtight containers, after a force is slightly applied to the bonded portion thereof in a separating direction, the helium amount is then measured for the 20 airtight containers. When the total number of the airtight containers is less than five which have a helium amount of $1 \times 10^{-12}$ Pa·m$^3$/s or more, after an increased force is further applied to the bonded portion in a separating direction, the helium amount of the 20 airtight containers are then measured. After a series of measurements in which a predetermined separating force is applied (or a first set of measurements in which a separating force is not applied), when the number of airtight containers which have a helium amount of $1 \times 10^{-12}$ Pa·m$^3$/s or more is five or more, the measurement is stopped. Airtight containers which have helium amount of less than $1 \times 10^{-12}$ Pa·m$^3$/s are regarded as a good product, and good product rates of the two type containers are then compared to each other. When the good product rate of the first airtight containers is higher than that of the second airtight containers, then it is confirmed that the bondability of the bonding agent to the contact member is superior to that of the bonding agent to a surface of the second member which is not provided with the contact member.

Hereinafter, with reference to drawings, preferred embodiments of the present invention will be describe by way of example. However, it is to be understood that the dimensions, materials, arrangement, and the like of constituent elements described in these embodiments will not limit the present invention at all. In the embodiments, an electron emission element is used as a display element; however, as a display element, other elements such as an electroluminescent element and a plasma display element may also be used.

Figure 20A:
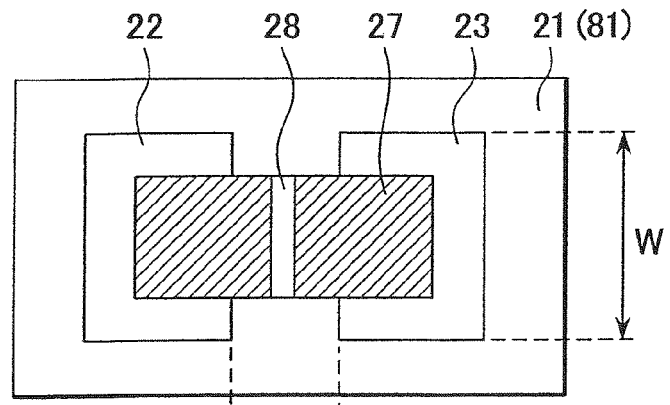
FIG. 20 is a schematic view of one example of the structure of a surface conduction type electron emission element.
Figure 20B:
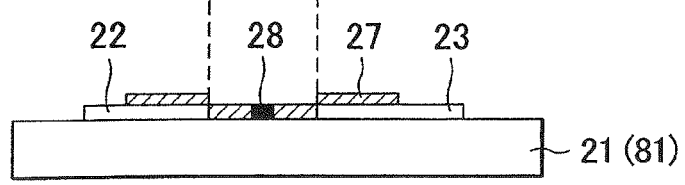
Figure 21:
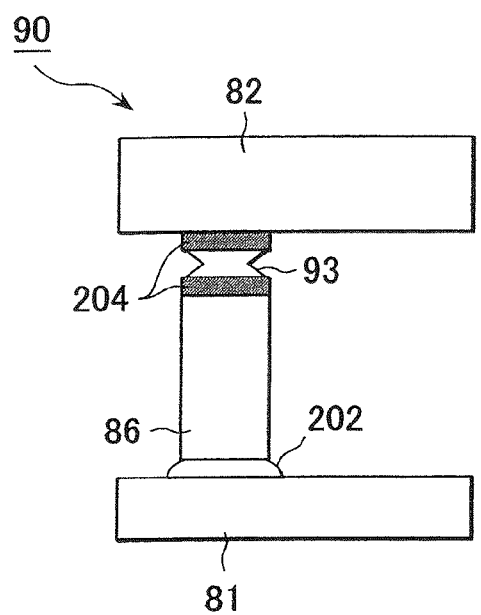
FIG. 21 is a schematic cross-sectional view of one example of the structure of a peripheral portion of a related envelope.
Figure 22:
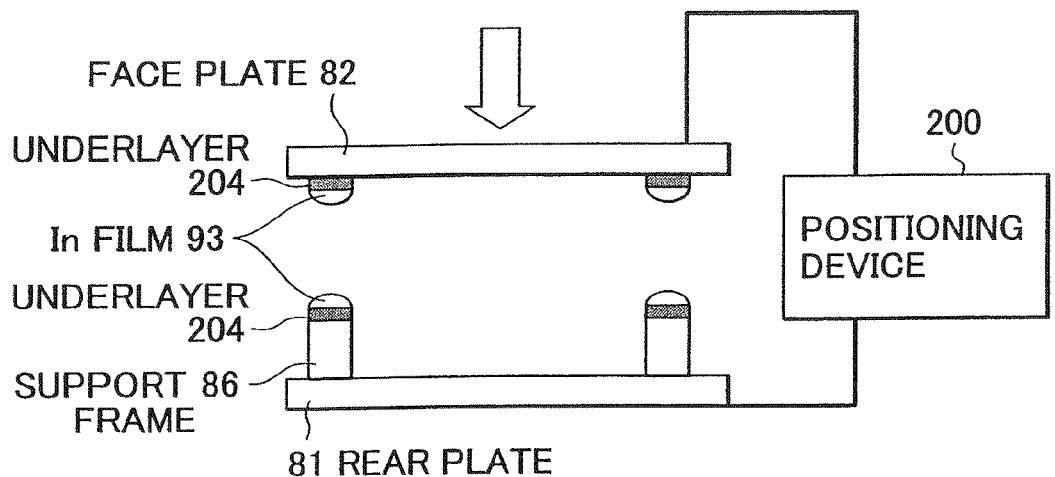
FIG. 22 is a schematic view of one example of a related sealing method.

In an image display device of this embodiment, as an electron emission element disposed at an electron source, an element having the structure shown in FIG. 20 is used.

A substrate 21 is made of glass or the like, and the size and the thickness thereof are appropriately determined, for example, in consideration of the number of electron emission elements and designed shapes of the individual elements. In addition, when the substrate is formed to serve as a part of a container while an electron source is operated, dynamic conditions, such as a structure having resistance against an atmospheric pressure so that the container is held under vacuum, are also taken into consideration.

As a glass material, an inexpensive blue sheet glass may be used. In addition, on the glass substrate, a silicon oxide film is preferably formed thereon to form a two-layered substrate. When a blue sheet glass is used as the substrate, in particular, this silicon oxide film may be used as a sodium blocking layer. The silicon oxide film is preferably formed to have a thickness of approximately 0.5 µm. In addition, this silicon oxide film is preferably formed by sputtering. Furthermore, a glass containing a small amount of sodium and a quartz substrate may also be used as the substrate of the embodiments according to the present invention.

As a material for element electrodes 22 and 23, a common conductive material is used, and a metal or an alloy, such as nickel (Ni), chromium (Cr), gold (Au), molybdenum (Mo), platinum (Pt), titanium (Ti) or a palladium (Pd)-silver (Ag) alloy, may be preferably used. In addition, a printed conductive material formed of a metal oxide, a glass and the like, a transparent conductor such as indium tin oxide (ITO), or the like may also be used. The thickness thereof is preferably in the range of from several hundreds of angstroms to several micrometers.

A distance L between the element electrodes, a length W, the shape, and the like thereof are appropriately designed in accordance with application in which the element is practically used; however, the distance L is preferably in the range of from several thousands of angstroms to one millimeter, and more preferably, in consideration of a voltage applied between the element electrodes, in the range of from 1 to 100 µm. In addition, the length W is preferably in the range of from several to several hundreds of micrometers in consideration of the electrode resistance and electron emission properties.

A conductive film (element film) 27 used as an electron source is formed so as to be placed on both element electrodes 22 and 23.

As the conductive film 27, in order to obtain superior electron emission properties, a fine particle film made of fine particles is particularly preferable. In addition, the thickness thereof is optionally set, for example, in consideration of a step coverage for the element electrodes 22 and 23, the resistance therebetween, and foaming treatment conditions which will be described later; however, the thickness is preferably in the range of from several to several thousands of angstroms, and more preferably, in the range of from 10 to 500 Å. The sheet resistance thereof is preferably in the range of from $10^3$ to $10^7$ Ω.

As a material for the conductive film, in general, Pd is suitably used; however, the material is not limited thereto. In addition, as a film-forming method, for example, sputtering or firing performed after application of solution may be optionally used.

An electron emission portion 28 is formed, for example, by supplying electricity as described below. For the convenience of illustration in the figures, the electron emission portion 28 in a rectangular shape is shown at the center of the conductive film 27; however, this is a schematic view, and the position and the shape of an actual electron emission portion are not precisely shown in the figure.

When electricity is supplied between the element electrodes 22 and 23 by a power source not shown in the figure at a predetermined vacuum level, the structure of a part of the conductive film 27 is changed to form a gap (crack), and this gap area forms the electron emission portion 28. In addition, electron emission occurs in the vicinity of the gap formed by this foaming at a predetermined voltage; however, the efficiency of electron emission in this state is very low.

Examples of voltage waveforms used in foaming (hereinafter referred to as "electrical foaming") by electricity supply are shown in FIG. 9. In particular, the voltage waveform is preferably a pulse waveform. As a method therefor, for example, there may be mentioned a method in which a pulse having a constant peak pulse voltage is sequentially applied as shown in FIG. 9A and a method in which a pulses is applied while the peal pulse voltage is increased as shown in FIG. 9B.

First, the case in which the peak pulse voltage is constant will be described with reference to FIG. 9A. In FIG. 9A, T1 and T2 indicate a pulse width and a pulse interval, respectively. In general, T1 is set in the range of from 1 μs to 10 ms, and T2 is set in the range of from 10 μs to 100 ms. The peak voltage (peak voltage in electrical foaming) of a triangle waveform is appropriately selected in accordance with the state of the electron emission element. Under the conditions described above, for example, a voltage is applied for several seconds to several tens of minutes. The pulse wave is not limited to a triangle wave. A desired waveform such as a rectangular waveform may also be used.

Next, the case in which a pulse is applied while the peak pulse voltage is increased will be described with reference to FIG. 9B. T1 and T2 in FIG. 9A may be the same as those shown in FIG. 9A. The peak voltage (peak voltage in electrical foaming) of a triangle waveform may be increased, for example, by approximately 0.1 V per step.

The electrical foaming may be stopped when the resistance reaches, for example, 1 MΩ or more which is obtained by measuring current flowing through an element to which a pulse voltage is applied.

After this electrical foaming is completed, the electron emission efficiency is very low. Accordingly, in order to increase the electron emission efficiency, treatment called "activation" is preferably performed for the element.

This activation treatment can be performed when a pulse voltage is repeatedly applied between the element electrodes 22 and 23 in an appropriate vacuum atmosphere in which an organic compound is present. By introducing a gas containing carbon atoms, carbon or a carbon compound derived therefrom is deposited in the vicinity of the gap (crack) as a carbon film.

In one example of this process, trinitrile to be used as a carbon source is introduced in a vacuum space through a slow leak valve, and the inside is maintained at a pressure of approximately $1.3 \times 10^{-4}$ Pa. Although being slightly influenced, for example, by the shape of a vacuum device and members provided therein, the pressure of the trinitrile thus introduced is preferably set in the range of from approximately $1 \times 10^{-5}$ to $1 \times 10^{-2}$ Pa.

Figure 12A:
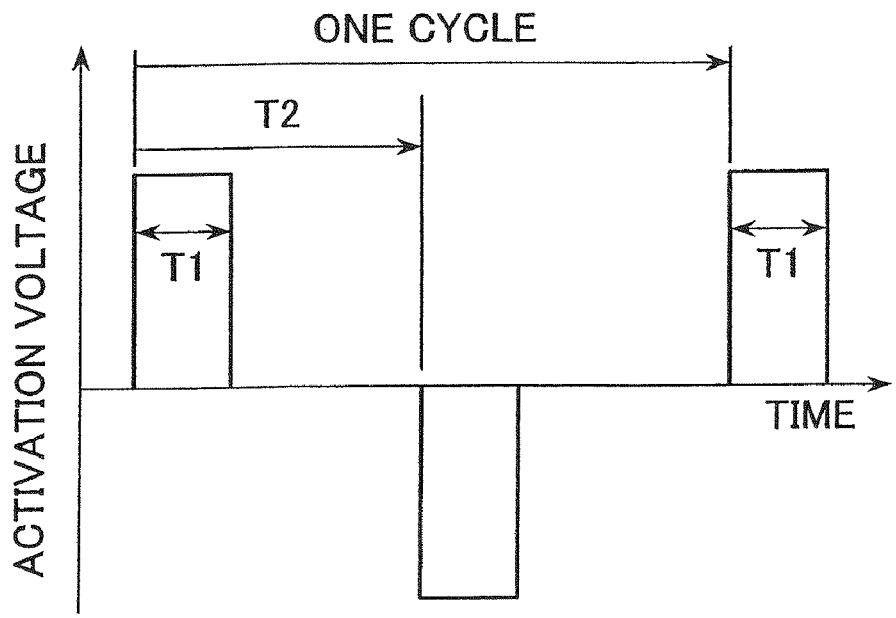
FIGS. 12A and 12B are graphs of an activation voltage with time.
Figure 12B:
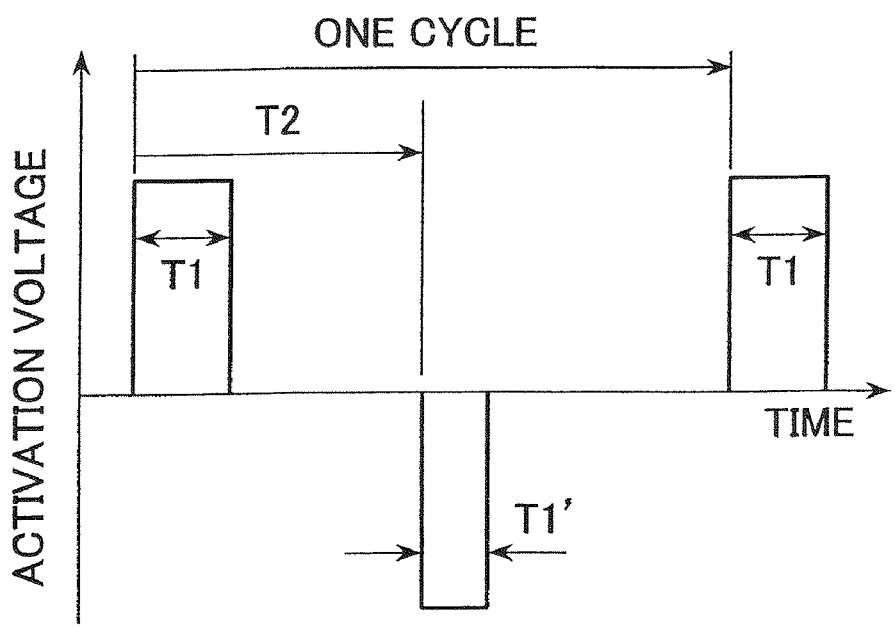

In FIGS. 12A and 12B, preferable examples of voltage application used in the activation step are shown. A maximum applied voltage is optionally selected from the range of 10 to 20 volts.

In FIG. 12A, T1 indicates a pulse width of each of a positive and a negative voltage waveform, T2 indicates a pulse interval, and the absolute values of the positive and the negative voltages are set equal to each other. In addition, in FIG. 12B, T1 and T1' indicate pulse widths of a positive and a negative voltage waveform, respectively, T2 indicates a pulse interval, T1>T2 is satisfied, and the absolute values of the positive and the negative voltages are set equal to each other.

In the case described above, when an emission current Ie reaches an approximately saturated level, the supply of electricity is stopped, and the slow leak valve is closed, thereby stopping the activation treatment.

By the steps described above, an electron emission element as shown in FIG. 20 can be formed.

Basic properties of an electron emission element, which has the element structure and is formed by the manufacturing method as described above, will be described with reference to FIGS. 10 and 11.

Figure 10:
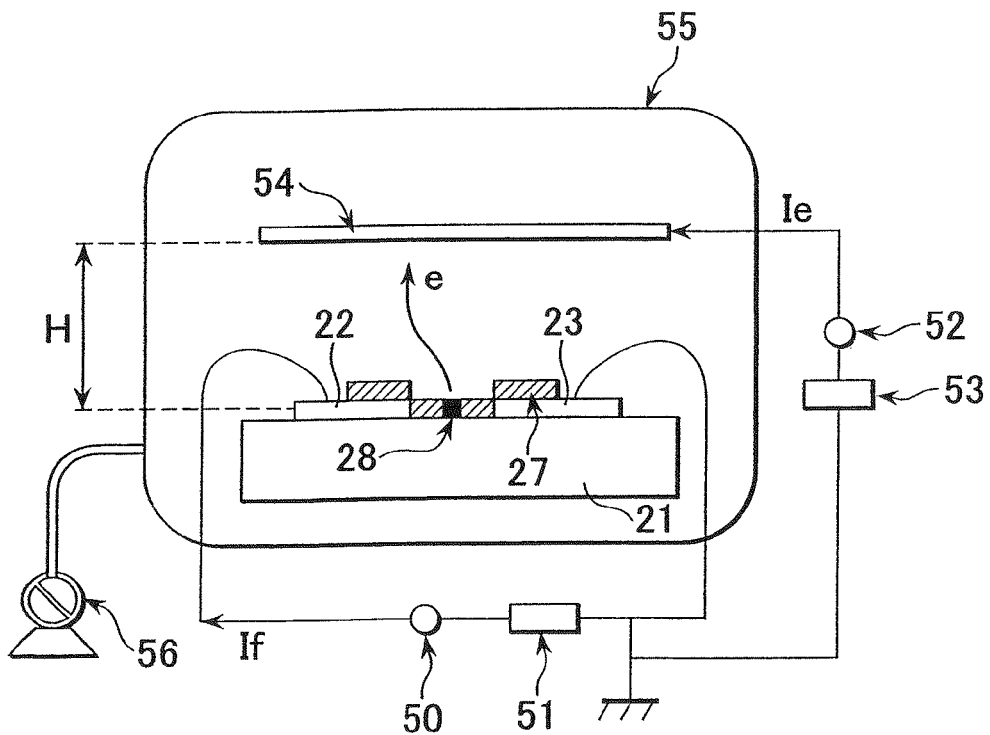
FIG. 10 is a schematic view of an apparatus for measuring properties of an electron emission element of the present invention.

FIG. 10 is a schematic view of a measurement apparatus for measuring electron emission properties of an electron emission element having the structure described above. In FIG. 10, reference numeral 51 indicates a power source applying an element voltage Vf to an element; reference numeral 50 indicates an ampere meter measuring an element current If flowing through an electrode portion of the element; reference numeral 54 is an anode collecting an emission current Ie emitted from an electron emission portion of the element; reference numeral 53 indicates an high voltage power source applying a voltage to the anode 54; and reference numeral 52 is an ampere meter measuring the emission current Ie emitted from the electron emission portion.

When the element current If flowing between the element electrodes 22 and 23 of the electron emission element and the emission current Ie flowing to the anode are measured, the power source 51 and the ampere meter 50 are connected to the element electrodes 22 and 23, and the anode 54 connected to the power source 53 and the ampere meter 52 is disposed above the electron emission element.

In addition, the electron emission element and the anode 54 are placed in a vacuum device 55, and a vacuum pump 56 and necessary components, such as a vacuum meter, required for a vacuum device are provided for the vacuum device 55, so that the measurement of the electron emission element can be performed at a desired vacuum level. In addition, the measurement is performed at a voltage of the anode 54 of 1 to 10 kV and at a distance H between the anode and the electron emission element of 2 to 8 mm.

Figure 11:
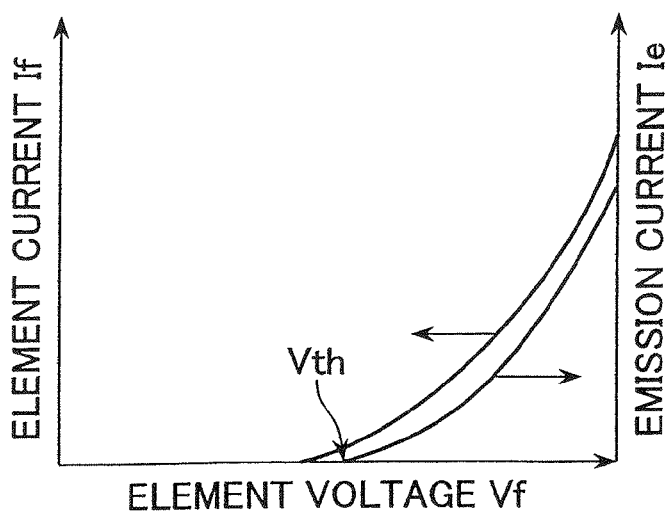
FIG. 11 is a graph showing the relationship of an element voltage with an element current and an emission current of a surface conduction type electron emission element of the present invention.

A typical example of the relationship of the element voltage Vf with the emission current Ie and the element current If measured by the measurement device shown in FIG. 10 is shown in FIG. 11. In this graph, although the magnitude of the emission current Ie is appreciably different from that of the element current If, since the changes of If and Ie are qualitatively compared to each other, the vertical axis of this graph represents a linear arbitrary unit.

This electron emission element has three features on the emission current Ie.

First, as can be seen in FIG. 11, when an element voltage having a certain level (hereinafter referred to as "threshold voltage", Vth shown in FIG. 11) or more is applied to this element, the emission current Ie is rapidly increased, and on the other hand, when an element voltage is less than the threshold voltage Vth, the emission current Ie is not substantially sensed. That is, it is understood that this element has properties as a nonlinear element which has an apparent threshold voltage Vth with respect to the emission current Ie.

Secondary, since depending on the element voltage Vf, the emission current Ie can be controlled by the element voltage Vf.

Thirdly, the amount of emission charge collected by the anode 54 depends on the time for applying the element voltage Vf. That is, the amount of charge collected by the anode 54 can be controlled by the time for applying the element voltage Vf.

Next, an electron source and an image display device of this embodiment will be described.

Figure 2:
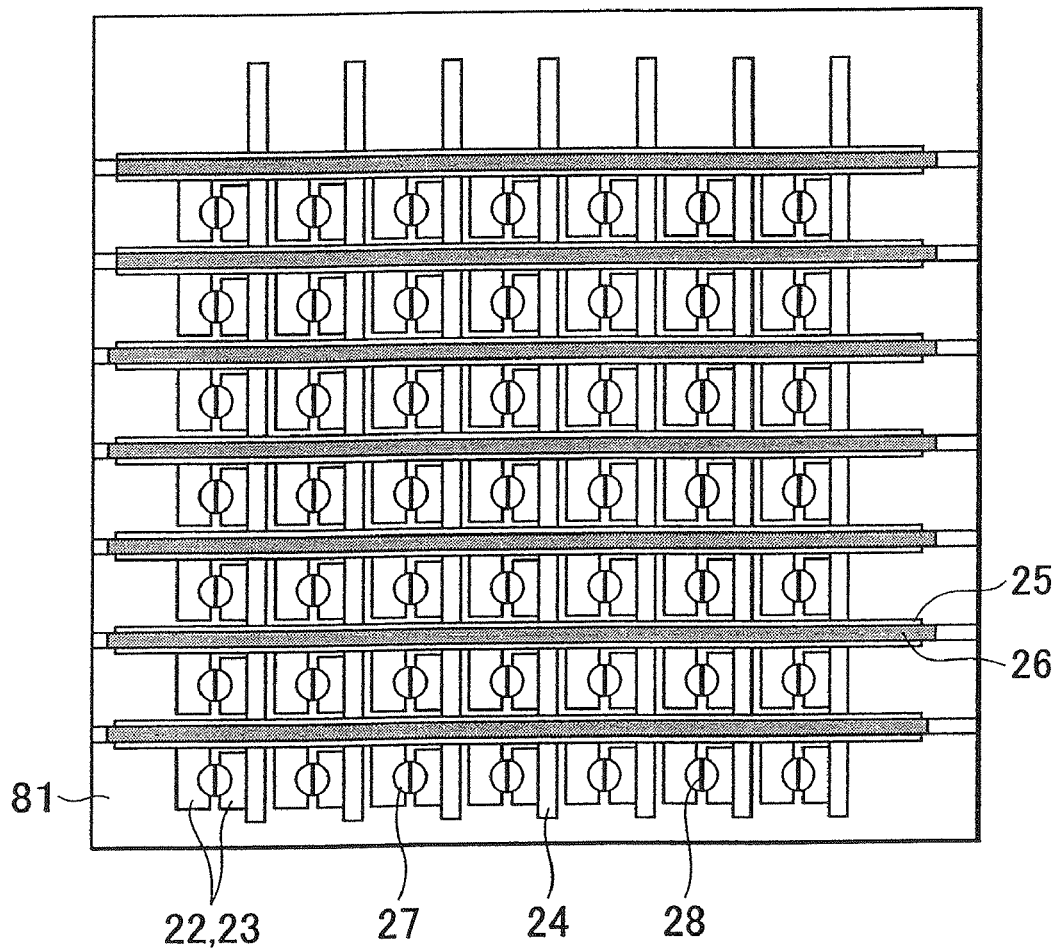
FIG. 2 is a schematic plan view of the structure of an electron source used for an image display device of the present invention.

As a basic structure of this embodiment, for example, the structure shown in FIG. 2 may be mentioned. In this electron source, on a substrate 81, there are provided a plurality of Y-direction wires (lower wires) 24 and a plurality of X-direction wires (upper wires) 26 above the Y-direction wires 24 with an insulating layer 25 provided therebetween, and in the vicinity of each of the intersecting positions between the two direction wires, an electron emission element containing a pair of electrodes (element electrodes 22 and 23) is provided.

The image display device of this embodiment has the structure having an electron source as shown in FIG. 2, and a basic structure thereof will be described with reference to FIG. 13 which shows a general structure of an image display device.

Figure 13:
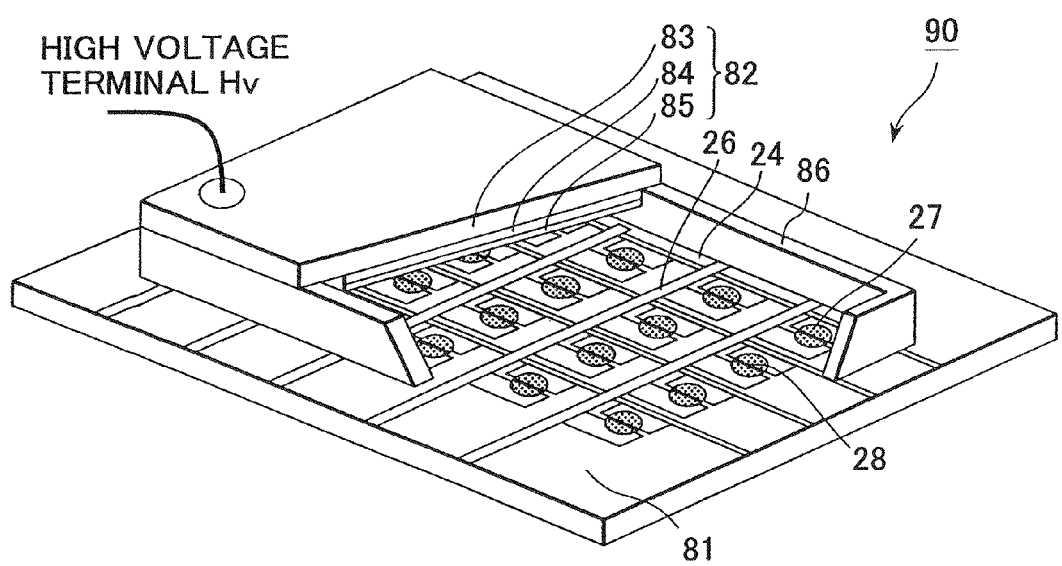
FIG. 13 is a schematic perspective view of a general structure of an image display device.

In FIG. 13, reference numeral 81 indicates a substrate forming the electron source, reference numeral 82 indicates a face plate, which is a substrate formed of a fluorescent film 84, a metal back 85, and the like provided on a glass plate 83, and reference numeral 86 indicates a support frame used as a surrounding member. The substrate 81 forming the electron source, the support frame 86, and the face plate 82 are bonded to each other with a bonding agent such as an In film or a frit glass, followed by firing at 400 to 500° C. for 10 minutes or more for sealing, thereby forming an envelope 90 used as an airtight container.

When a support body called a spacer (not shown in the figure) is disposed between the face plate 82 and the electron source substrate 81, an envelope 90 having a sufficient strength against an atmospheric pressure can be formed which may be used for a large area panel.

A method for manufacturing an envelope of this embodiment comprises the steps of bonding the support frame 86 first to the electron source substrate 81 or the face plate 82 with a frit glass or the like, forming an underlayer on a contact face of the support frame 86 when the envelope 90 is formed with a predetermined space between the electron source substrate 81 and the face plate 82, and then providing a bonding agent on this underlayer. In the step described above, the underlayer is selected so that the wettability of the bonding agent to the underlayer is superior to that of the bonding agent to a surface of the support frame 86 which is not provided with the underlayer.

As the bonding agent, a metal is preferably used, and in particular a low melting point metal is preferably used. A bonding agent having a melting point of 200° C. or less is preferably used. In addition, when a metal is used as the bonding agent, indium or an alloy thereof may be preferably used as the metal.

In addition, for the underlayer, a metal is preferably used, and in particular a metal unlikely to be oxidized is preferably used. The underlayer preferably has a composition different from that of the bonding agent. In particular, when a metal is used for the bonding agent, a metal which is unlikely to be oxidized as compared to that for the bonding agent is preferably used for the underlayer. The degree of resistance against oxidation is defined by the value of the standard redox potential. For this underlayer, silver, gold, platinum, or an alloy containing at least one of metals mentioned above is preferably used.

In addition, on a position of the other substrate (substrate to which the support frame 86 is not bonded), which opposes the bonding agent, a contact member having a composition different from that of the bonding agent is provided. In this step, the bondability of the bonding agent to the contact member is superior to that of the bonding agent to a surface of the other substrate (substrate to which the support frame 86 is not bonded) which is not provided with the contact member.

As the contact member, an oxide film is preferably used, and in particular, $SiO_2$ or $PbO$ is preferable.

In addition, the materials or the shapes of the underlayer and the contact member or both the materials and the shapes thereof are preferably different from each other. Although the same material may be used for the underlayer and the contact member, superior wettability and bondability may not be always obtained at the same time. In particular, when the surface of the bonding agent has an oxide layer, it becomes difficult to obtain those properties at the same time. In this embodiment, even when a surface (surface before the contact member is formed thereon) on which the contact member is to be formed comprises an oxide, an oxide film is formed as the contact member. For example, when a member on which the contact member is to be formed is a substrate forming the electron source, although the substrate forming the electron source has an oxide layer on the surface thereof, for example, a position of the substrate, which is to be brought into contact with the bonding agent, may be contaminated by treatment such as the formation of electron emission elements or the formation of wires and/or may be provided with members such as wires or the like. In addition, when a member on which the contact member is to be formed is a substrate forming the face plate, although the substrate forming the face plate has an oxide layer on the surface thereof, for example, a position of the substrate, which is to be brought into contact with the bonding agent, may be contaminated by treatment such as the formation of the fluorescent film or the formation of the metal back used as an accelerating electrode and/or may be provided with members such as the electrode, wires, and the like. Accordingly, the step of forming the contact member on a member is preferably performed after at least one treatment is finished which should be carried out for the member before the step of bringing the contact member into contact with the bonding agent. In particular, the step of forming the contact member on a member is preferably performed after the formation of predetermined constituent elements such as wires and/or electrodes is performed on a position of the member which is brought into contact with the bonding agent. More particularly, the step of forming the contact member on a member is most preferably performed after all the treatment is finished which should be carried out for the member before the step of bringing the contact member into contact with the bonding agent.

In addition, a bonded portion made by the underlayer, the bonding agent, and the contact member is formed as a closed bond line along the support frame functioning as the surrounding member. For example, in the structure shown in FIG. 13, when wires are formed on the surface of the substrate 81 forming the electron source so as to extend outside past the bond line, and when the substrate 81 forming the electron source is the substrate on which the contact member is formed, even if the substrate 81 has an oxide on the surface thereof as is a substrate which is coated with a silicon oxide film, since the wires are formed the surface, the bondability at the positions on which the wires are formed may be insufficient in some cases. In the case described above, the contact member may be formed at least on the positions at which the wires are formed. That is, after the contact member having superior bondability to the bonding agent is placed all along the position at which the bond line is to be formed so as to be brought into contact with the bonding agent, the contact member may then be brought into contact with the bonding agent. More preferably, after the step of forming the contact member all along the position at which the bond line is to be formed, the contact member is then brought into contact with the bonding agent. In addition, the underlayer is also preferably formed all along the position at which the bond line is to be formed.

The bonding method of the present invention is preferably used in particular when the bonding is performed in a reduced-pressure atmosphere, and in more particular, and the bonding method is suitably used when the step of providing the bonding agent on the underlayer is performed in an atmosphere in which at least the surface of the bonding agent is oxidized.

In addition, in the step of providing the bonding agent on the underlayer, when the bonding agent is melted and disposed, the bonding method of the present invention is preferably used.

Particular structure, operation, and the like of a vacuum sealed portion of the image display device of this embodiment will be described in detail with reference to the examples described later.

The internal pressure (total pressure) of an envelope, that is, an airtight container, of this example was $10^{-5}$ Pa or less. After this pressure was obtained, getter treatment was also performed in order to maintain the vacuum level in the envelope 90 after sealing.

Of the getters, there are an evaporation and a non-evaporation type getter. An evaporation type getter, made of an alloy primarily containing Ba or the like, is heated in the envelope 90 by applying electricity or high frequency to form a deposition film (getter flashing) on the inside wall of the container, and hence gases generated inside are absorbed by an active getter metal surface, thereby maintaining high vacuum.

On the other hand, as for a non-evaporation type getter, a getter material made of Ti, Zr, V, Al, Fe, or the like is disposed and heated in a vacuum state for "getter activation" in order to obtain gas absorption properties, thereby absorbing generated gases.

In general, since a flat type image display device has a small thickness, it is difficult to secure a region in which an evaporation type getter is disposed and a flash region for instantaneous discharge, and hence the getter is provided in the vicinity of a support frame which is located outside an image display area. Accordingly, the conductance between the central portion of the image display and the region at which the getter is provided is decreased, and as a result, the effective evacuation rate at the central portion of the electron emission elements and/or the fluorescent film is decreased.

In the image display device having an electron source and an image display member, an area at which unfavorable gases are generated is the image display region which is irradiated primarily with electron beams. Hence, in order to maintain the fluorescent film and the electron source at a high vacuum level, non-evaporation type getters are preferably disposed in the vicinity of the fluorescent film and the electron source, which evolve gases.

Figure 15:
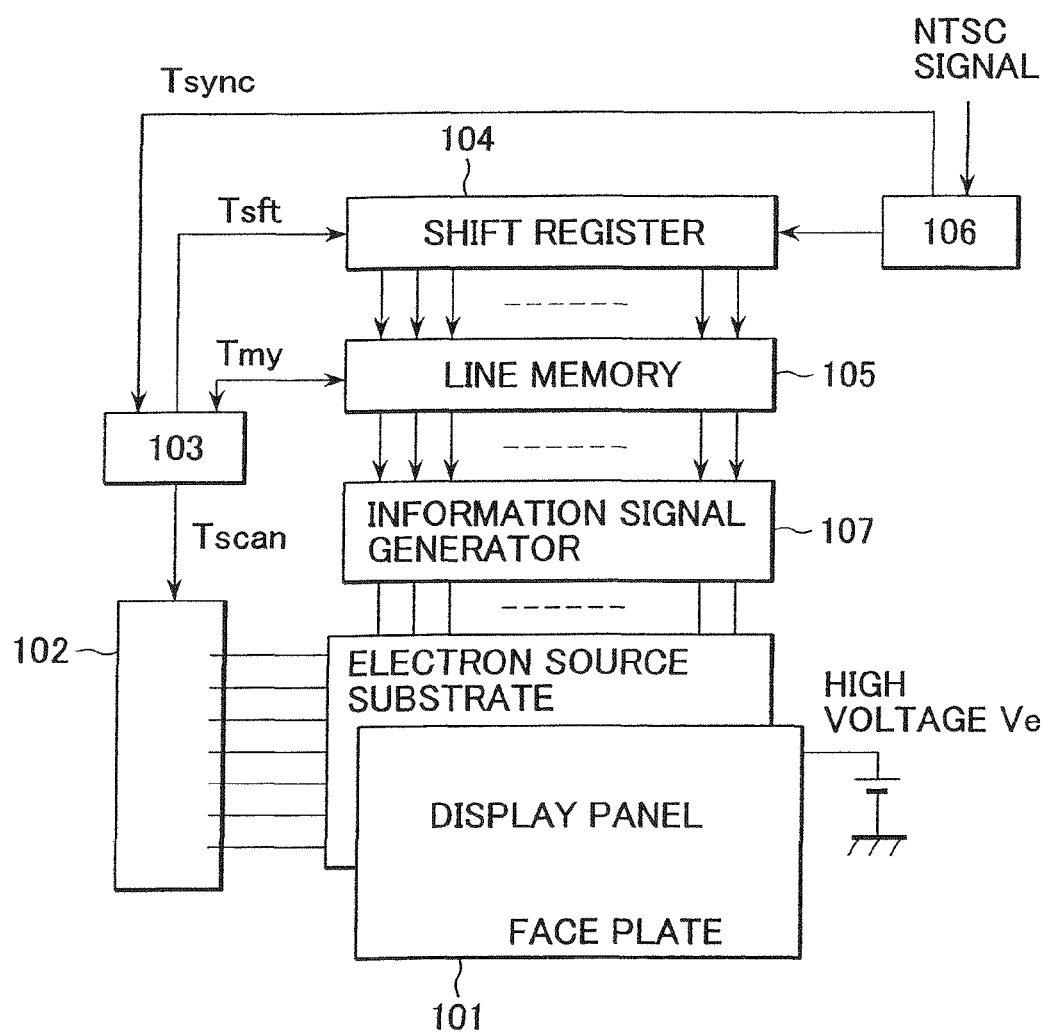
FIG. 15 shows a drive circuit of an image display device of the present invention.

The structure of an image display device for television display based on television signals of an NTSC system is shown in FIG. 15 by way of example which uses a display panel formed of a simple matrix type electron source as shown in FIG. 2.

In FIG. 15, reference numeral 101 indicates an image display panel (envelope) as shown in FIG. 13, reference numeral 102 indicates a scanning circuit, reference numeral 103 indicates a control circuit, reference numeral 104 indicates a shift register, reference numeral 105 indicates a line memory, reference numeral 106 indicates a synchronization signal separation circuit, reference numeral 107 indicates an information signal generator, and symbol Va indicates a DC power source.

As described above, in the image display device of the present invention, electron emission is performed by applying a voltage to each electron emission element through two types of direction wires, and electron beams thus generated are accelerated by applying a high voltage to the metal back 85 used as an anode through a high voltage terminal Hv connected to the DC power source Va so as to collide with the fluorescent film 84, thereby displaying an image.

In this case, according to the manufacturing method of the image display device of this embodiment, the generation of vacuum leak at a welded portion can be significantly effectively suppressed, and an image having superior quality can be displayed for a long period of time.

The structure of the image display device described in this embodiment is one example of the image display devices of the present invention, and various modification may be made in accordance with the spirit and the scope of the present invention. As for input signals, an NTSC system is described by way of example; however input signals are not limited thereto, and PAL, HDTV, or the like may also be used.

EXAMPLES

Hereinafter, examples of the present invention will be described; however, the present invention is not limited to the following examples.

Example 1

In this example, an electron source was formed which was composed of a great number of surface-conduction electron emission elements wired in a matrix as shown in FIG. 2, and by using this electron source, an image display device as shown in FIG. 13 was formed.

First, on the electron source substrate 81, as the electron emission elements, electron emission elements shown in FIG. 20 were formed.

Hereinafter, a manufacturing method of the electron source, according to this example, will be described with reference to FIGS. 2 to 8.

(Formation of Element Electrode)

Figure 3:
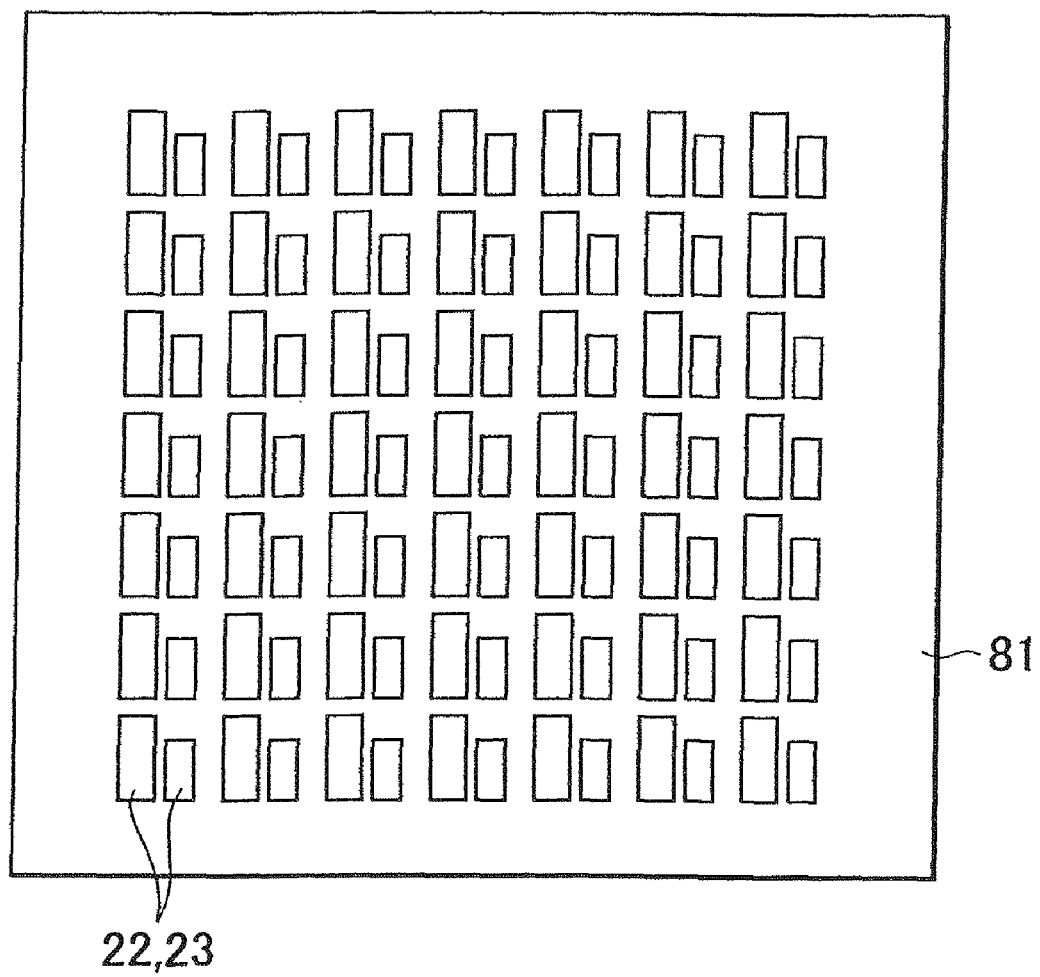
FIG. 3 is an explanatory view of a manufacturing step of the electron source shown in FIG. 2.
Figure 4:
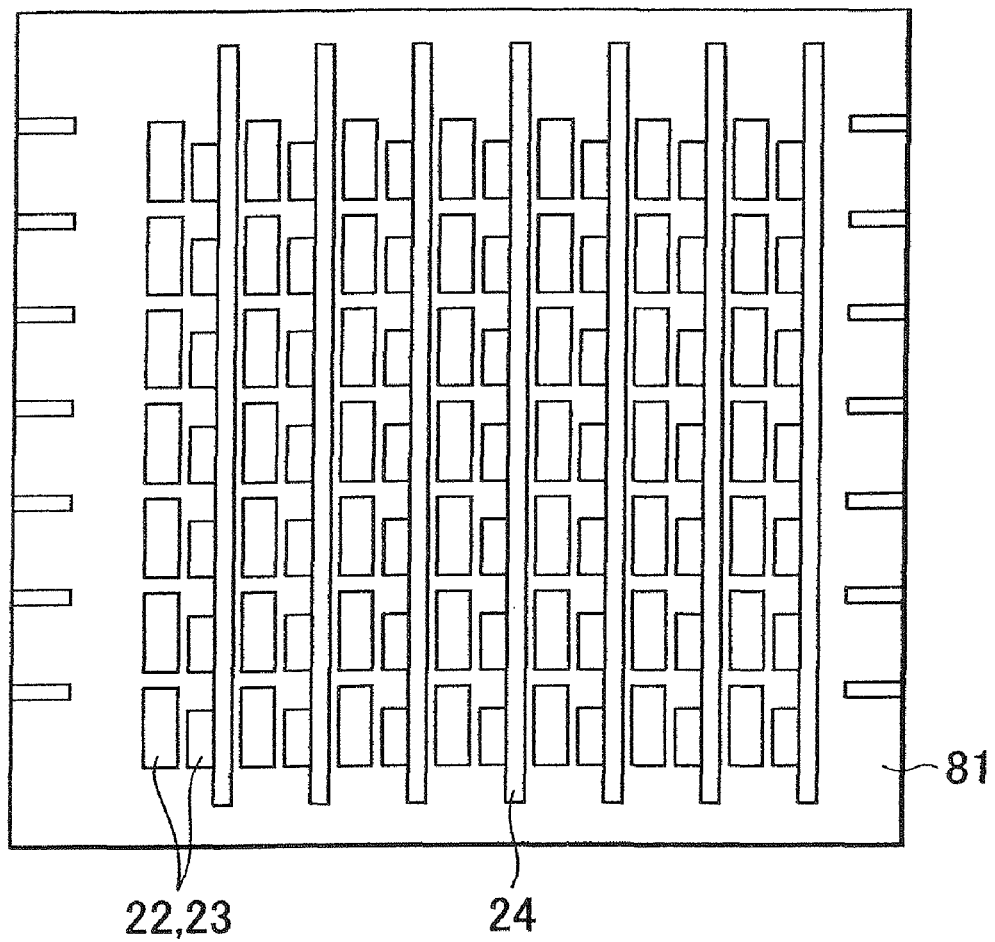
FIG. 4 is an explanatory view of a manufacturing step of the electron source shown in FIG. 2.
Figure 5:
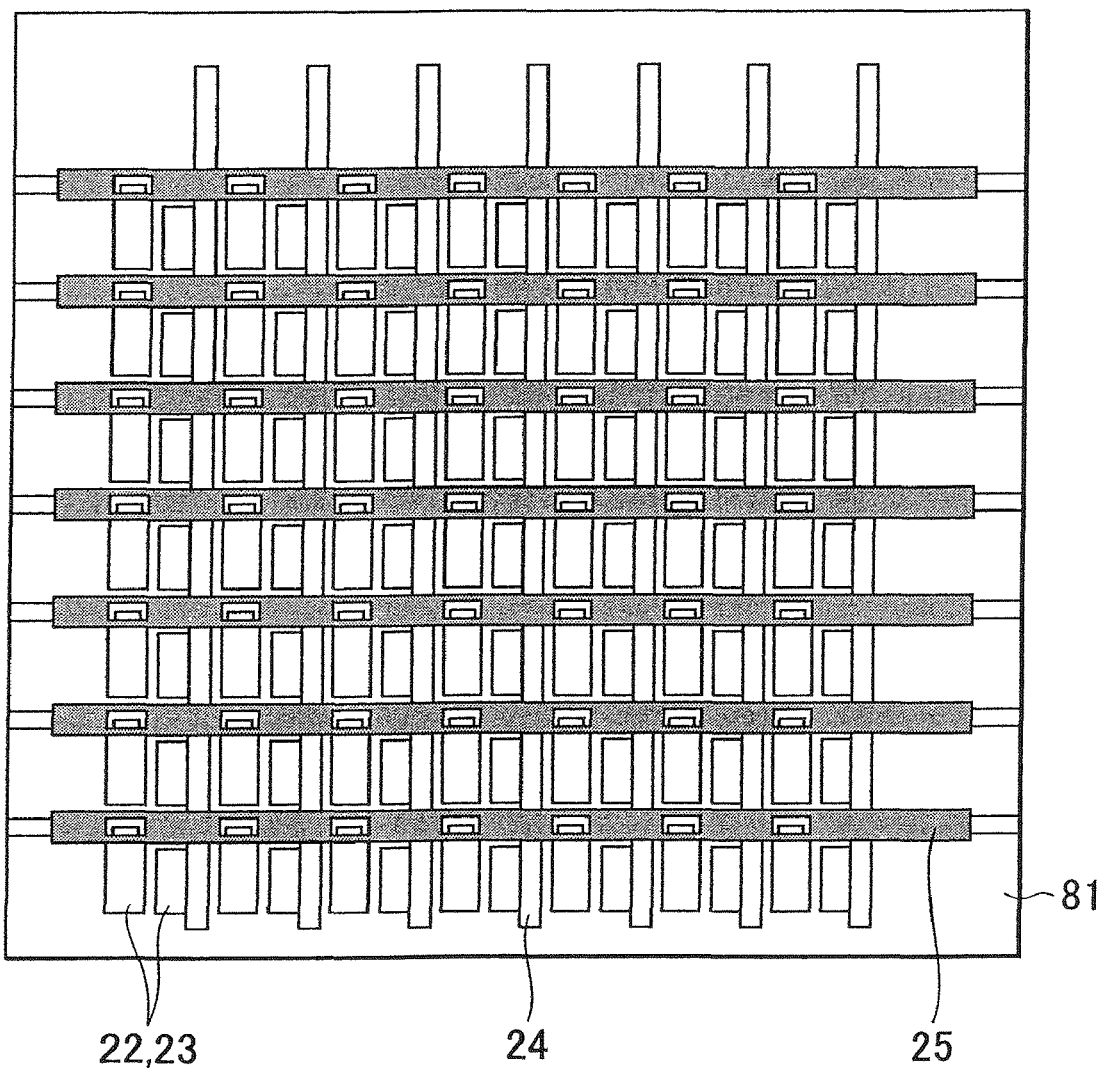
FIG. 5 is an explanatory view of a manufacturing step of the electron source shown in FIG. 2.

On the glass substrate 81, after titanium (Ti) 5 nm thick was first deposited by sputtering as an underlying layer, a platinum (Pt) film 40 nm thick was formed thereon, and subsequently, patterning was performed by a photolithographic method including application of a photoresist, exposure, development, and etching, thereby forming element electrodes 22 and 23 (see FIG. 3). In this example, the distance L between the element electrodes was set to 10 μm, and the length W of one electrode facing to the other electrode was set to 100 μm.

(Formation of Y-Direction Wires)

Wire materials for Y-direction wire 24 and X-direction wire 26 are preferably a low-resistance material which can supply an approximately uniform voltage to a great number of surface-conduction electron emission elements, and in addition to the wire material, the thickness, width, and the like of the wires may be appropriately determined.

The Y-direction wires 24 were formed by the steps of screen-printing a silver (Ag) paste ink, drying the ink thus printed, and then firing the ink at a temperature of approximately 420° C. (see FIG. 4). The Y-direction wires 24 were each connected to element electrodes disposed in the Y direction, each of which is one type of the pair of element electrodes, and were formed so as to function as a scanning electrode after a panel was formed. The thickness of this Y-direction wire 24 was approximately 15 μm, and the width thereof was approximately 100 μm. In addition, lead wires connected to an external drive circuit were formed by the method similar to that described above.

(Formation of Interlayer Insulating Layers)

In order to insulate between the X-direction and the Y-direction wires, interlayer insulating layers 25 were formed. In order to cover the intersections between the X-direction wires which are described later and the Y-direction wires (scanning signal wires) which were formed beforehand, and in order to obtain electrical connection between the X-direction wire and the element electrodes, each of which is the other type of the pair of element electrodes, the interlayer insulating layers 25 were each formed to have contact holes at connection portions corresponding to the individual elements (see FIG. 5).

In particular, after a photo-glass paste was screen-printed over the entire surface, exposure using a photomask having a predetermined pattern was performed, followed by development, and finally firing was performed.

In this example, a process including printing, exposure, development, and firing was repeated four times, thereby forming a laminate. The firing was performed at a temperature of approximately 480° C. The thickness of this interlayer insulating layer 25 was approximately 30 μm on the whole, and the width thereof was 150 μm.

(Formation of X-Direction Wires)

Figure 6:
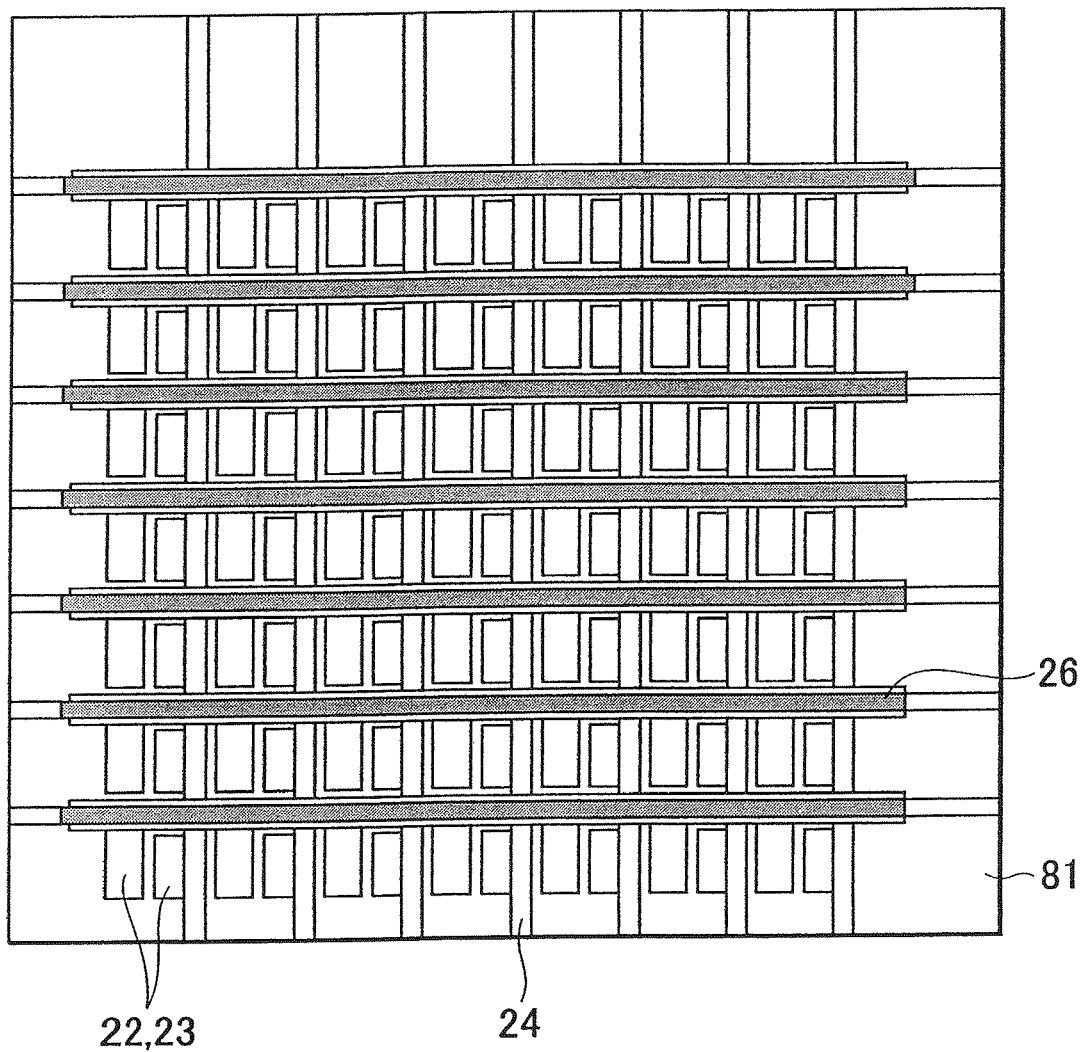
FIG. 6 is an explanatory view of a manufacturing step of the electron source shown in FIG. 2.
Figure 7:
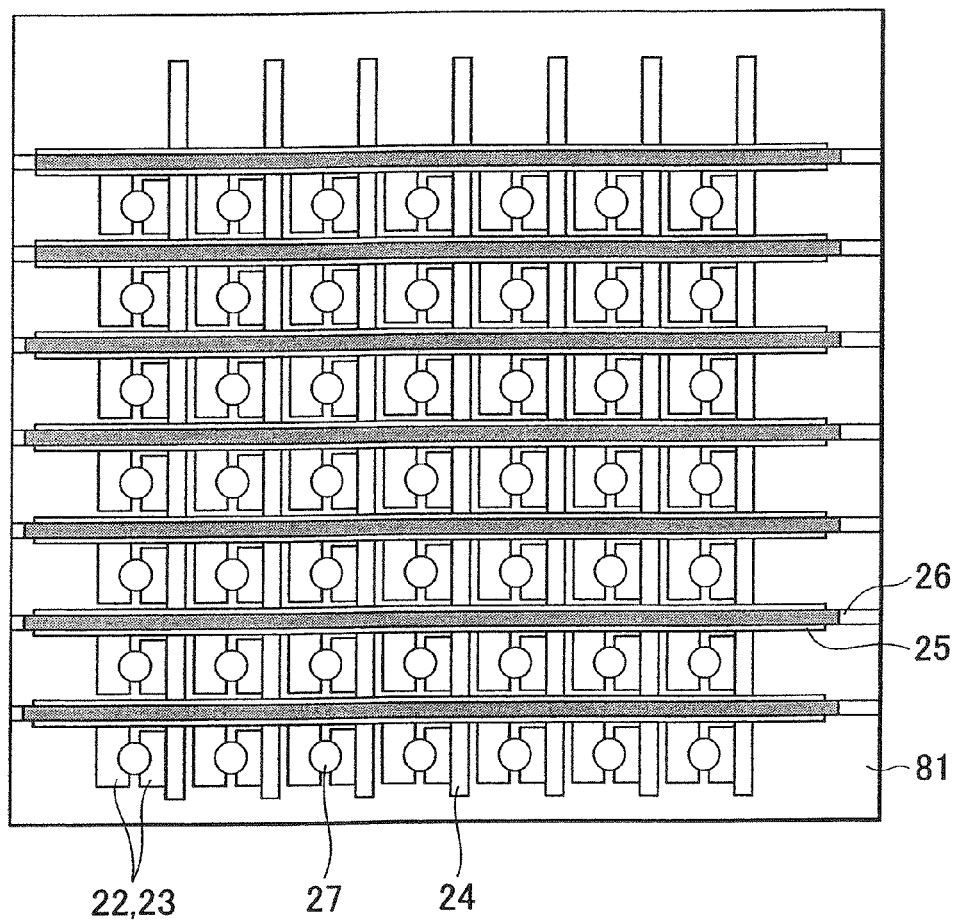
FIG. 7 is an explanatory view of a manufacturing step of the electron source shown in FIG. 2.

The X-direction wires 26 used as a common wire were each connected to the other type of the pair of electrodes, which was disposed in the X direction, and were formed in a stripe pattern (see FIG. 6). After a silver (Ag) photo-paste ink used as a material was screen-printed, followed by drying, exposure was performed using a photomask having a predetermined pattern, and then development was performed. Subsequently, the wires were formed by firing at a temperature of approximately 480° C. The thickness of this X-direction wire 26 was approximately 10 μm, and the width thereof was approximately 50 μm.

As described above, a substrate having an XY matrix wire arrangement was formed.

(Formation of Conductive Film)

Next, after the substrate was sufficiently washed, the surface thereof was processed with a solution containing water-repellent agent so as to form a hydrophobic surface. The reason for this is that an aqueous solution for forming a conductive film, which is subsequently applied on the surface of the substrate, is disposed so as to be appropriately spread over the element electrodes.

Subsequently, the conductive film 27 was formed between the element electrodes 22 and 23. This step will be described with reference to schematic views shown in FIGS. 8A to 8C. In order to compensate for a two-dimensional positional deviation of each element electrode on the substrate 81, after the positional deviations of the pattern were measured at several points on the substrate, the amounts of deviation between the measurement points were linearly approximated, followed by performing positional correction, and a conductive-film forming material was then applied. Accordingly, the positional deviation for each pixel could be corrected, and application of the material could be precisely performed onto the appropriate positions.

In this example, in order to obtain a palladium film as the conductive film 27, a palladium-proline complex was dissolved to have a concentration of 0.15 percent by weight in an aqueous solution containing water and isopropyl alcohol (IPA) at a ratio of 85 to 15, thereby forming an a solution containing organic palladium. To this solution, a small amount of additives was added. Droplets of this solution were applied between the element electrodes using an inkjet ejecting device provided with a piezoelectric element as a droplet-applying device so as to obtain a dot diameter of 60 μm (FIG. 8A).

Subsequently, this substrate was processed by firing performed at 350° C. for 10 minutes in the air, thereby forming a conductive film 27' made of palladium oxide (PdO) (FIG. 8B). A film having a dot diameter of approximately 60 μm and a maximum thickness of 10 nm was obtained.

(Foaming Step)

Next, in the step called a foaming step, a crack was formed inside the conductive film 27' by applying electricity, thereby forming the electron emission portion 28 (FIG. 8C).

As a particular method, a vacuum space was formed between the substrate 81 and a hood-shaped lid, which was provided so as to cover the entire substrate except for lead wire portions disposed along the periphery of the substrate 81, and a voltage was then applied between the two direction wires 24 and 26 through terminals of these lead wires by an external power source so that electricity was applied between the element electrodes 22 and 23. Accordingly, a part of the conductive film 27' was damaged, deformed, or modified, and as a result, the electron emission portion 28 having a high electrical resistance was formed.

In this step, when the application of electricity was performed during heating in a vacuum atmosphere containing a small amount of a hydrogen gas, reduction was facilitated by the presence of hydrogen, and as a result, the conductive film 27' made of palladium oxide (PdO) was changed into the conductive film 27 made of palladium (Pd).

In this change caused by the reduction, the contraction of the film occurred, and a crack was generated in a part thereof; however, the position at which the crack was generated and the shape thereof were largely depend on the uniformity of the original film. In order to suppress the variation in properties among a great number of elements, the crack was preferably generated at the central portion of the conductive film 27 and most preferably had a linear shape.

From the vicinity of the crack formed by this foaming, electron emission also occurred at a predetermined voltage; however, the emission efficiency was still very low under the current conditions.

The foaming treatment in this example was performed using a pulse waveform as shown in FIG. 9B, and T1 and T2 were set to 0.1 ms and 50 ms, respectively. An applied voltage was set to 0.1 V at the start and was then increased stepwise every five seconds by approximately 0.1 V. In order to stop the electrical foaming, a current flowing through the element during application of a pulse voltage was measured to obtain the resistance, and when this resistance became 1,000 times or more the resistance obtained before the foaming treatment, the foaming treatment was stopped.

(Activation Step)

As was the foaming described above, a vacuum space was formed between the substrate 81 and a hood-shaped lid provided thereon for covering, and a pulse voltage was repeatedly applied between the element electrodes 22 and 23 from the outside through the two direction wires 24 and 26. In addition, a gas containing carbon atoms was introduced in the space, so that carbon or a carbon compound derived therefrom was deposited as a carbon film in the vicinity of the crack.

In this example, trinitrile was used as a carbon source and was introduced into the vacuum space through a slow leak valve, and the pressure was maintained at $1.3 \times 10^{-4}$ Pa.

FIG. 12 shows an example of a preferable voltage application used in the activation step. The maximum voltage for application was appropriately selected from the range of from 10 to 20 V.

After approximately 60 minutes from the start, at which the emission current Ie was approximately saturated, the application of electricity was stopped, and the slow leak valve was closed, thereby finishing the activation treatment.

By the steps described above, an electron source composed of a great number of electron emission elements wired in a matrix on the board was formed.

Next, by using the electron source thus formed, an image display device was then manufactured. With reference to FIGS. 1, 13, and 14, the manufacturing method will be described.

FIG. 1 is a schematic cross-sectional view of the peripheral portion of the envelope 90 of the image display device according to this example.

In FIG. 1, reference numeral 81 indicates the substrate of the electron source provided with a great number of electron emission elements, and this substrate is called a rear plate. Reference numeral 82 indicates the face plate composed of a glass substrate, a fluorescent film, and a metal back, the latter two constituent elements being provided on the internal surface of the glass substrate.

Figure 14A:
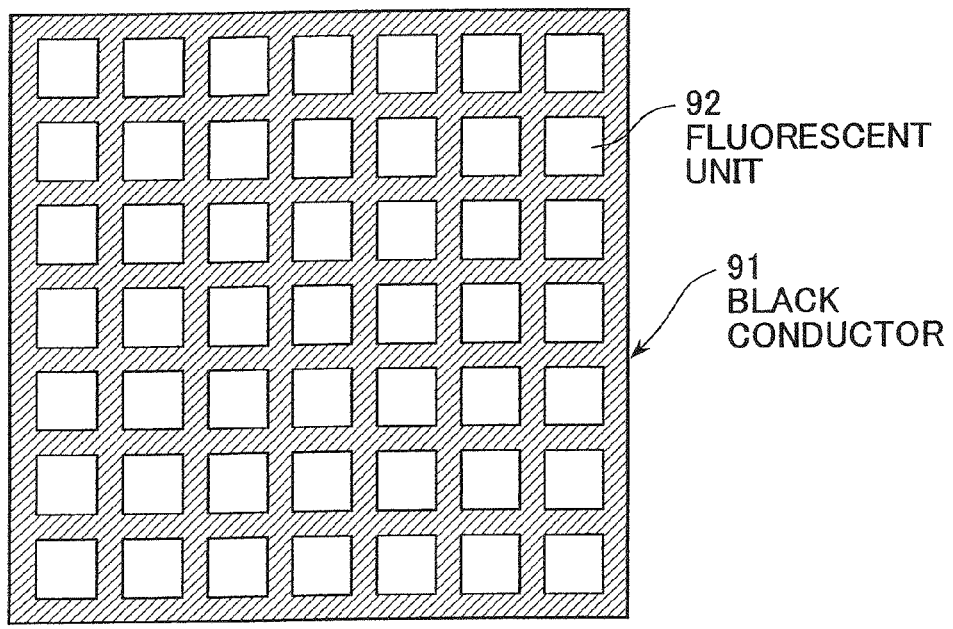
FIGS. 14A and 14B are schematic perspective views of a fluorescent film of an image display device of the present invention.
Figure 14B:
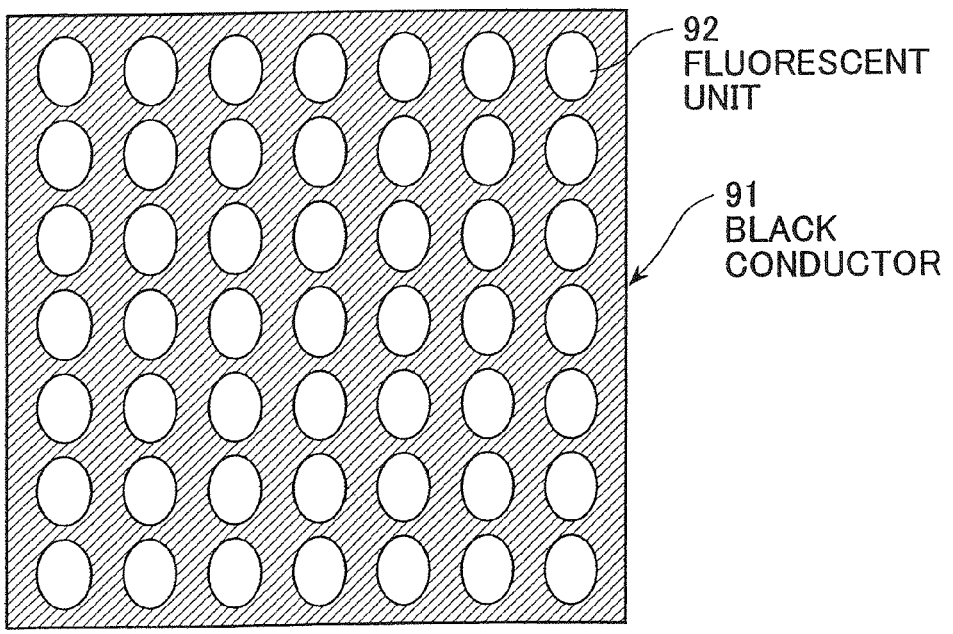

FIGS. 14A and 14B are explanatory views of the fluorescent film 84 provided on the face plate 82. The fluorescent film 84 is composed of only a fluorescent material in the case of monochrome display, and in the case of a fluorescent film for color display, the color fluorescent film is formed of fluorescent units 92 and a black conductor 91, which is called a black stripe or black matrix depending on the arrangement of the fluorescent units. An object of the black stripe or the black matrix thus provided is to darken areas located between the individual fluorescent units, such as three primary color fluorescent units required for color display, so as to hide unfavorable color mixture or the like, in addition, is to suppress the decrease in contrast at the fluorescent film 84 caused by external light reflection.

In addition, on the internal surface side of the fluorescent film 84, the metal back 85 is generally provided. The functions of the metal back 85 are, for example, to improve the brightness by specularly reflecting part of light emitted from the fluorescent film, which is incident on the internal side, to the face plate 82 side and to serves as an anode for applying an electron beam accelerating voltage. The metal back 85 can be formed by the steps of smoothing (in general, called filming) the surface of the fluorescent film at the internal side following the formation thereof, and then depositing aluminum (Al) by vacuum deposition or the like.

In this example, as a material for the face plate 82, PD-200 (manufactured by Asahi Glass Co., Ltd.), which is an electric glass used for plasma display containing a small amount of alkali component, was used as was the case of the rear plate 81.

When a support called a spacer 205 (see FIG. 1) is provided between the face plate 82 and the rear plate 81, the envelope 90 having a sufficient strength against an atmospheric pressure can be formed so as to be used for a large area panel.

The support frame 86 was adhered to the rear plate 81 with a frit glass 202 and was then fixed thereto by firing at a temperature of 400 to 500° C. for 10 minutes or more. In addition, the support frame 86 and the face plate 82 were bonded to each other with an In film 93, which was used as the bonding agent, provided therebetween.

The support frame 86 and the spacer 205 were formed so that the height of the spacer 205 was slightly higher than that of the support frame 86 adhered to the rear plate 81 with the frit glass 202, and hence the thickness of the In film 93 after the bonding was determined. Accordingly, the spacer 205 also functioned as a member defining the thickness of the In film 93.

Since evolving a small amount of gas even at a high temperature and having a low melting point, the In film 93 was used. When a metal or an alloy is used as a bonding agent, it is not necessary to use a solvent and a binder. Since a material containing a solvent and a binder is not used for a bonding agent, the amount of gas evolved therefrom can be decreased.

An underlayer 204 was provided on the support frame 86 corresponding to the first member. By this underlayer, the adhesion at the interface could be enhanced. In this example, silver was used which had a good wettability to metal In used as a bonding agent. The underlayer 204 made of silver can be easily formed by screen printing so as to have a desired shape. As the underlayer 204 for the In film 93, a thin metal film made of ITO, Pt, or the like may also be used. The underlayer mentioned above may also be provided by vacuum deposition.

A contact member 203 was provided on the face plate 82 corresponding to the second member. In this example, a $SiO_2$ film primarily composed of $SiO_2$ was used. The contact member 203 made of the $SiO_2$ film was formed by screen printing of an insulating printing paste primarily composed of $SiO_2$. As a method for forming the contact member 203, for example, a method of applying a sol-gel solution by spin coating or dipping or a vacuum deposition method such as sputtering may also be mentioned.

Figure 16:
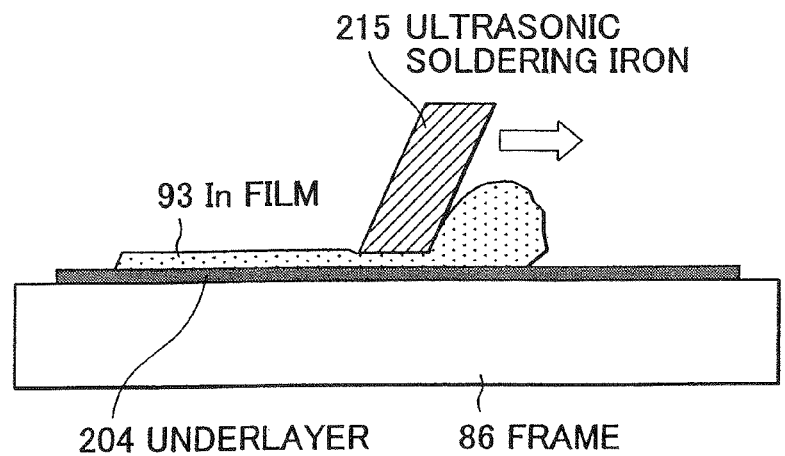
FIG. 16 is an explanatory view of a forming method of an In film (bonding agent) of the present invention.

Before the face plate 82 and the rear plate 81 were bonded to each other, that is, before the sealing was performed, the In film 93 was patterned beforehand. Referring to FIG. 16, a method for foaming the In film 93 on the support frame 86 adhered to the rear plate 81 will be described.

First, in order to further improve the wettability of molten In to the underlayer, the support frame 86 was held in a sufficiently heated state. The heated state at a temperature of 100° C. or more was sufficient. The underlayer 204 made of a silver paste was a porous film containing a large amount of air voids inside although having a high adhesion to glass. Hence, in this example, in order to impregnate the underlayer 204 with the molten In, the molten In at the melting point thereof or more was soldered to the underlayer 204 by a ultrasonic soldering iron 215, thereby forming the In film 93. Liquid In melted at a temperature of 200° C. or more will be good enough for this step. The metal In was supplied whenever necessary to the front end of the soldering iron 215 by an In supply unit (not shown in the figure) so that a position at which the In film 93 is formed is always provided with In. In addition, in order to obtain a sufficiently large thickness of the In film 93 as compared to that of the In film 93 after the bonding, the moving speed of the ultrasonic soldering iron 215 and the supply amount of In were controlled. In this example, in order to form the In film 93 after sealing to have a thickness of approximately 300 μm, the film thickness of the In film 93 provided for the support frame 86 was set to approximately 500 μm. The In used as the bonding agent was provided on the underlayer under atmospheric conditions.

Figure 17:
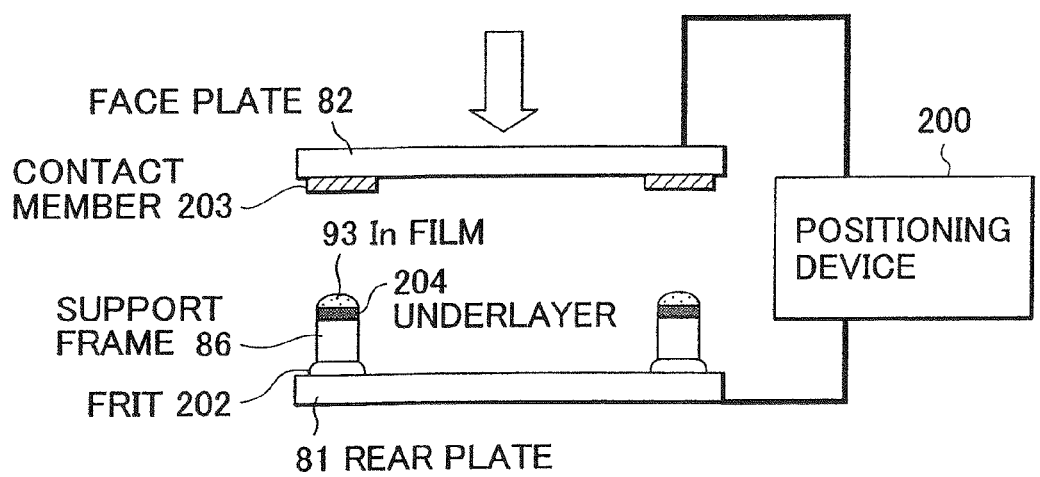
FIG. 17 is a schematic view of the structure used for a sealing method of the present invention.

After formed on the support frame 86 by the forming method shown in FIG. 16, the panel was formed by a sealing method shown in FIG. 17. This step and the subsequent steps were performed in a vacuum chamber. While a predetermined distance between the face plate 82 and the rear plate 81 was maintained, the two substrates were heated under vacuum conditions. Vacuum baking was performed at a high temperature, such as 300° C. or more, so that gases were evolved from the substrates and that when the temperature was decreased to room temperature, the inside of the panel was at a sufficient vacuum level. In this step, the In film 93 was melted and had high fluidity. In order to prevent the molten In from running off, the rear plate 81 was very strictly maintained in the horizontal position. After the vacuum baking, the temperature was decreased to a temperature close to the melting point of In, and by gradually decreasing the distance between the face plate 82 and the rear plate 81 so that the two plates were brought into contact with each other, the two plates were bonded to each other, that is, the sealing was performed. The reason the temperature was decreased to a temperature close to the melting point was to decrease the fluidity of the liquid In in a molten state so as to prevent the In from running off or protruding in bonding.

In the method for forming the In film 93 described above with reference to FIG. 16, an oxide film was formed on the surface thereof. In this example, in order to decrease the variation in thickness of the In film 93, the underlayer 204 was used. In addition, the structure in which the In film was not formed at the face plate 82 side was used. Furthermore, on the substrate at the face plate 82 side, a $SiO_2$ film (contact member 203), which was likely to be bonded to the oxide film present on the surface of the bonding agent, was formed beforehand by screen-printing so that the In film (In film having an oxide layer on the surface thereof) was likely to be bonded with the $SiO_2$ film.

After the display panel as shown in FIG. 13 was manufactured as described above, a drive circuit including a scanning circuit, a control circuit, a modulation circuit, and a DC power source was connected to the display panel, thereby manufacturing a flat type image display device.

According to the basic properties of a surface conduction type electron emission element formed as the electron source of this example, the amount of emission electrons from the electron emission portion is controlled by the peak value and the width of the pulse voltage applied between the element electrodes facing each other when the voltage is equal to or more than the threshold voltage, the amount of charges is also controlled by the intermediate values of the voltage and the width, and hence gray display can be performed.

In addition, in the case in which a great number of surface conduction type electron emission elements are disposed, when a selection line is determined in accordance with a scanning signal of each line, and the pulse voltage is appropriately applied to each element via the information signal line, a voltage can be appropriately applied to an optional element, and as a result, each element can be turned on.

In the image display device of this example, through the X-direction wires and the Y-direction wires, predetermined voltages were applied to the individual electron emission elements in a time-sharing manner, and a high voltage was applied to the metal back 85 through the high voltage terminal Hv; hence, a superior optional image pattern formed in a matrix could be displayed without any pixel defects.

Example 2

Figure 18:
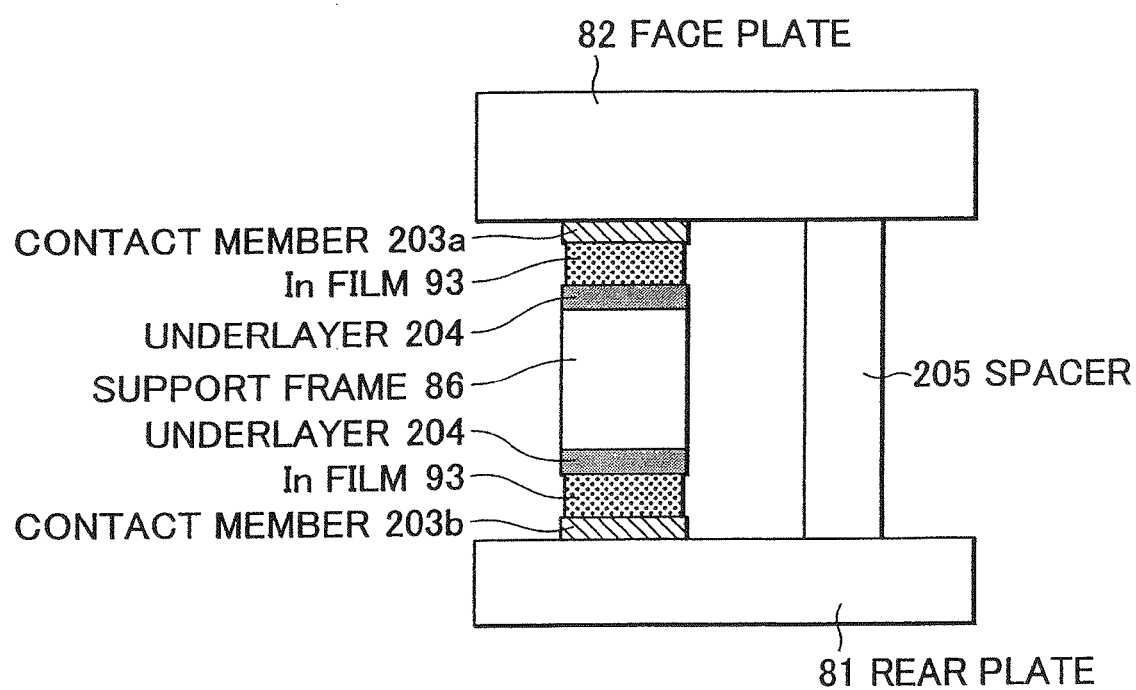
FIG. 18 is a schematic cross-sectional view of the structure of a peripheral portion of an envelope according to the present invention.
Figure 19:
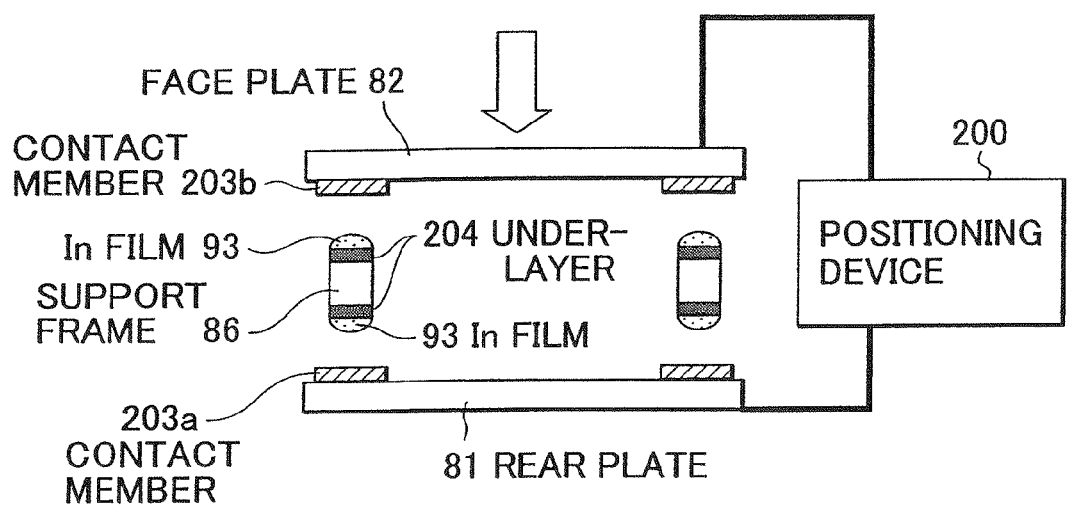
FIG. 19 is a schematic view of the structure used for a sealing method of the present invention.

In FIGS. 18 and 19, another example of the present invention is shown. FIG. 18 is a schematic cross-sectional view of a bonded portion at the periphery of an envelope, and FIG. 19 is a schematic view of a bonding step.

Figure 23:
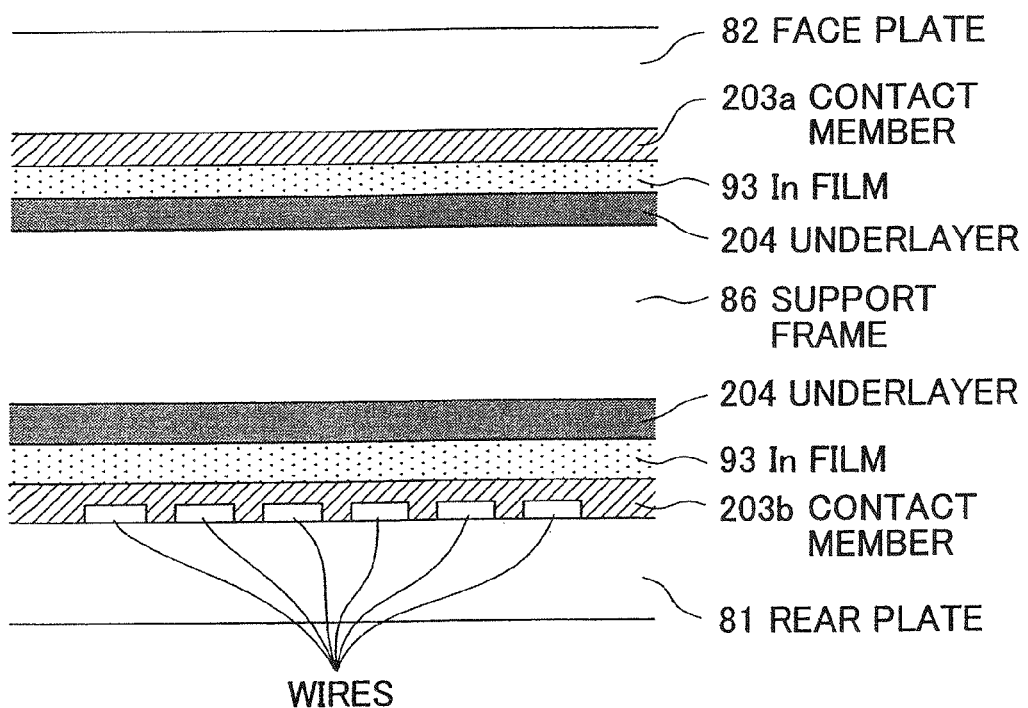
FIG. 23 is a side view showing of the structure of a peripheral portion of an envelope according to the present invention.

In this example, the bonding between the support frame 86 and the rear plate 81 was also performed with an In film. That is, the support frame corresponded to the first member, and both the face plate and the rear plate corresponded to the second member. Wires were provided for the rear plate 81 which were used for applying a voltage. A contact member 203*b* was a PbO film primarily composed of PbO. This contact member was used to improve the bondability to the bonding agent and, in addition, was also used as an insulating layer for insulating the In film used as a bonding agent from the wires. The rest of the structure was equivalent to that in Example 1. FIG. 23 shows the state in which the PbO film, which was used as the interlayer insulating film and the contact member, was provided on the rear plate corresponding to the second member so as to cover wires. FIG. 23 shows the structure of the bonded portion of the envelope when it is viewed from the left side in FIG. 18. A plurality of the wires was covered with the contact member 203*b* and the irregularities formed by the presence of the wires were smoothed also by the contact member 203*b*. As was the case of Example 1, the contact member was provided all along the periphery of the envelope, and hence the bonding of the envelope was achieved along the entire periphery thereof.

In this example, a film primarily composed of $SiO_2$ was used as a contact member 203*a* at the face plate side, and a film primarily composed of PbO was used as the contact member 203*b* at the rear plate side; however, the advantages can be obtained even when the combination of the films described above is optionally changed. In addition, the structure was used in which the underlayer was formed on the support frame and in which the face plate and/or the rear plate was provided with the contact member; however, the underlayer provided with the bonding agent may be formed on the face plate and/or the rear plate, and the contact member may be formed on the support frame.

Furthermore, in above Examples 1 and 2, the sealing process was performed under vacuum conditions; however, the present invention may be effectively applied to the case in which the envelope 90 having a vacuum space is formed by the steps of performing sealing under atmospheric conditions, and then evacuating the inside of the panel through an exhaust hole which is separately provided in the substrate.

According to the embodiments described above, an envelope capable of maintaining a high vacuum lever can be manufactured at a low cost. In addition, when the electron emission element and the display device using the same as an electron source are formed, an image display device can be manufactured having high electron emission properties under high vacuum and having superior display quality.

According to the present invention, a highly reliable bonding can be realized, a highly reliable airtight container can be manufactured, and in addition, a preferable image display device can be manufactured.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image display device, comprising:
   a first member;
   a layer comprised of silver, gold, platinum, an alloy of silver, an alloy of gold, or an alloy of platinum on the first member;
   a second member;
   a wire on the second member;
   an oxide film on the wire;
   a bonding agent which bonds the first member and the second member, the bonding agent being contacted with the layer and oxide film; and
   a display element.

2. The image display device according to claim 1, wherein the bonding agent comprises a metal.

3. The image display device according to claim 1, wherein one of the first member and the second member is a first substrate on which at least a part of the display element is formed and the other is a frame part of an airtight container of the image display device.

4. The image display device according to claim 3, further comprising a second substrate on which a fluorescent is formed, with the second substrate and the first substrate being spaced apart from each other.

5. The image display device according to claim 1, wherein the display element is an electron emitting device.

6. The image display device according to claim 1, wherein the bonding member comprises an indium or an alloy of indium.

7. An image display device, comprising:
   a first member;
   a layer comprised of silver, gold, platinum, an alloy of silver, an alloy of gold, or an alloy of platinum on the first member;
   a second member;
   a wire on the second member;
   an oxide film on the wire;
   a bonding agent which bonds the first member and the second member, the bonding agent being contacted with the layer and the oxide film; and
   a fluorescent.

8. The image display device according to claim 7, wherein the bonding agent comprises a metal.

9. The image display device according to claim 7, wherein one of the first member and the second member is a first substrate on which the fluorescent is formed and the other is a frame part of an airtight container of the image display device.

10. The image display device according to claim 9, further comprising a second substrate on which at least a part of a display element is formed, with the first substrate and the second substrate being spaced apart from each other.

11. The image display device according to claim 7, wherein the display element is an electron emitting device.

12. The image display device according to claim 7, wherein the bonding member comprises an indium or an alloy of indium.

* * * * *